US007613922B2

(12) United States Patent
Yui et al.

(10) Patent No.: US 7,613,922 B2
(45) Date of Patent: Nov. 3, 2009

(54) ELECTRONIC DEVICE CONTROLLING APPARATUS, ELECTRONIC DEVICE CONTROLLING SYSTEM, AND ELECTRONIC DEVICE CONTROLLING METHOD

(75) Inventors: Yasuji Yui, Kanagawa (JP); Hiroyuki Matsumura, Kanagawa (JP); Akira Yaegashi, Kanagawa (JP)

(73) Assignee: Sony Corporation, Tokyo (JP)

( * ) Notice: Subject to any disclaimer, the term of this patent is extended or adjusted under 35 U.S.C. 154(b) by 740 days.

(21) Appl. No.: 10/642,979

(22) Filed: Aug. 18, 2003

(65) Prior Publication Data

US 2004/0107352 A1 Jun. 3, 2004

(30) Foreign Application Priority Data

Aug. 19, 2002 (JP) ............................ 2002-237900
Aug. 30, 2002 (JP) ............................ 2002-252828

(51) Int. Cl.
*H04L 9/00* (2006.01)

(52) U.S. Cl. ...................................................... 713/168

(58) Field of Classification Search ................. 713/185, 713/172, 168, 189; 726/9, 4, 5, 18, 20, 27
See application file for complete search history.

(56) References Cited

U.S. PATENT DOCUMENTS 5,990,885 A * 11/1999 Gopinath .................... 715/716
6,199,076 B1 * 3/2001 Logan et al. ............. 715/501.1
2002/0059588 A1 * 5/2002 Huber et al. .................. 725/35
2002/0065905 A1 * 5/2002 Kliland et al. .............. 709/220
2002/0125993 A1 * 9/2002 Gutta et al. ................ 340/5.52
2002/0178441 A1 * 11/2002 Hashimoto ................... 725/11
2002/0199193 A1 * 12/2002 Gogoi et al. .................. 725/46
2003/0182663 A1 * 9/2003 Gudorf et al. ............... 725/110
2003/0229895 A1 * 12/2003 Jasinschi et al. .............. 725/46

FOREIGN PATENT DOCUMENTS

JP 11-146426 5/1999
JP 2001-357618 12/2001
JP 2002-092240 3/2002
JP 2002-232866 8/2002

* cited by examiner

*Primary Examiner*—Beemnet W Dada
(74) *Attorney, Agent, or Firm*—Finnegan, Henderson, Farabow, Garrett & Dunner, L.L.P.

(57) ABSTRACT

An electronic device controlling apparatus is disclosed which includes: a communication unit for communicating with electronic devices; a storing element for storing personal identification information and personal information in correspondence with each other; a detecting element for detecting personal identification information and a location where a person identified by the detected personal identification information is present; a searching element for searching the storing element for the personal information corresponding to the personal identification information detected by the detecting element; and a controlling element which, based on the personal information searched for by the searching element, causes the communication unit to transmit a control signal to the electronic device installed in the detected location.

12 Claims, 24 Drawing Sheets

F I G. 4

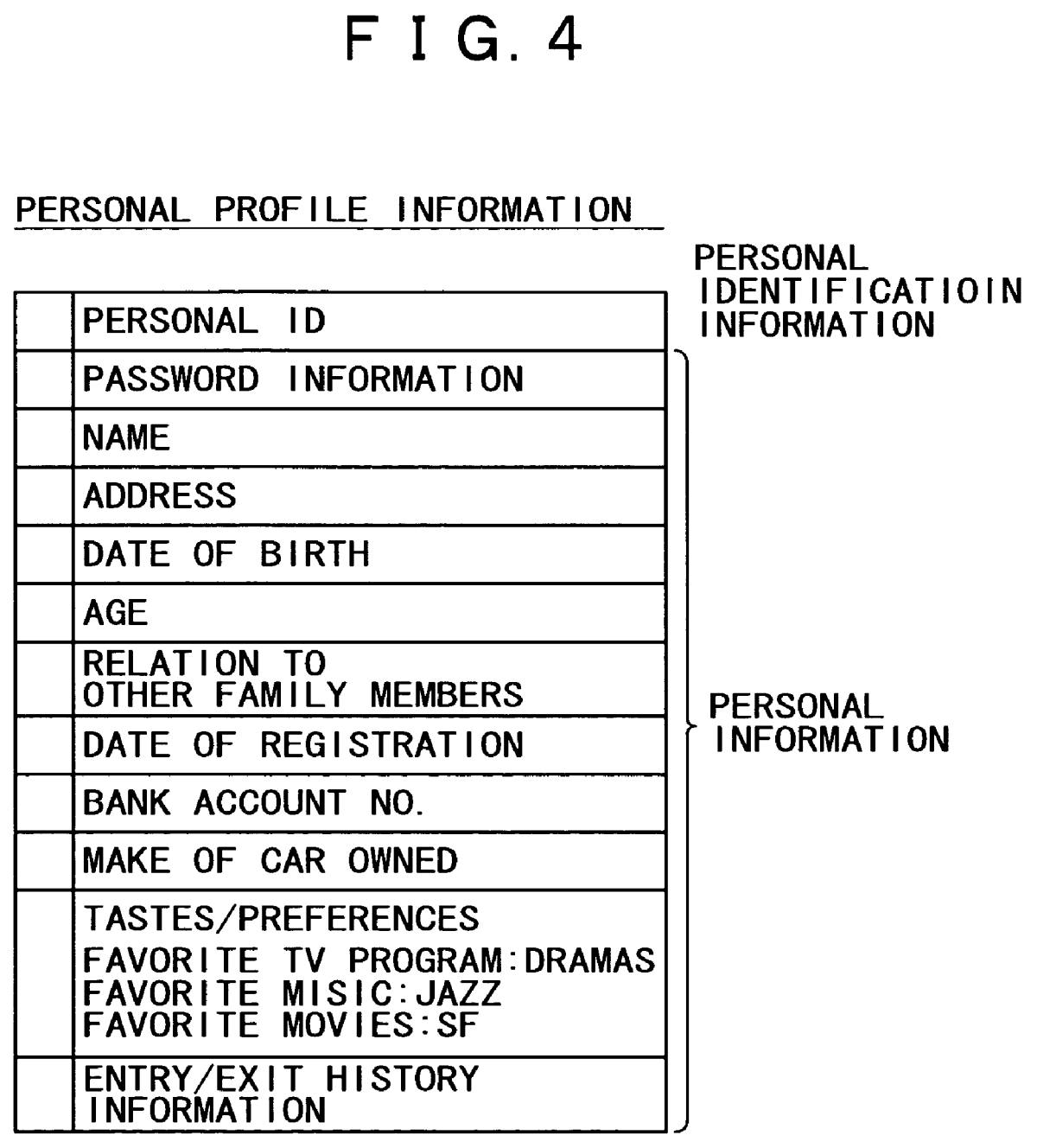

PERSONAL PROFILE INFORMATION

| | | |
|---|---|---|
| | PERSONAL ID | PERSONAL IDENTIFICATIOIN INFORMATION |
| | PASSWORD INFORMATION | PERSONAL INFORMATION |
| | NAME | |
| | ADDRESS | |
| | DATE OF BIRTH | |
| | AGE | |
| | RELATION TO OTHER FAMILY MEMBERS | |
| | DATE OF REGISTRATION | |
| | BANK ACCOUNT NO. | |
| | MAKE OF CAR OWNED | |
| | TASTES/PREFERENCES<br>FAVORITE TV PROGRAM:DRAMAS<br>FAVORITE MISIC:JAZZ<br>FAVORITE MOVIES:SF | |
| | ENTRY/EXIT HISTORY INFORMATION | |

FIG. 5

PRIORITY INFORMATION TABLE

| | NORMAL | NIGHT | EVENING | SATURDAY/ SUNDAY |
|---|---|---|---|---|
| FATHER | 1 | 3 | 3 | 1 |
| MATHER | 2 | 1 | 2 | 3 |
| CHILD | 3 | 2 | 1 | 2 |

FIG. 6

STAY-IN MANAGEMENT INFORMATION TABLE

| ROOM | STAY-IN PERSONS | | | |
|---|---|---|---|---|
| ROOM A | 01 (FATHER) | 03 (CHILD) | | |
| ROOM B | | | | |
| ROOM C | | | | |
| ROOM D | 02 (MOTHER) | | | |

FIG. 27

PERSONAL PROFILE INFORMATION

| | | |
|---|---|---|
| | PERSONAL ID | PERSONAL IDENTIFICATIOIN INFORMATION |
| | PASSWORD INFORMATION | PERSONAL INFORMATION |
| | NAME | |
| | ADDRESS | |
| | DATE OF BIRTH | |
| | AGE | |
| | RELATION TO OTHER FAMILY MEMBERS | |
| | DATE OF REGISTRATION | |
| | BANK ACCOUNT NO. | |
| | MAKE OF CAR OWNED | |
| | TASTES/PREFERENCES<br>FAVORITE TV PROGRAM:DRAMAS<br>FAVORITE MISIC:JAZZ<br>FAVORITE MOVIES:SF | |
| | ENTRY/EXIT HISTORY INFORMATION | |
| | ELECTRONIC DEVICE USAGE HISTORY INFORMATION | |

ELECTRONIC DEVICE CONTROLLING APPARATUS, ELECTRONIC DEVICE CONTROLLING SYSTEM, AND ELECTRONIC DEVICE CONTROLLING METHOD

BACKGROUND OF THE INVENTION

The present invention relates to an electronic device controlling apparatus and an electronic device controlling method for providing overall control of electronic devices such as TV sets installed in a number of rooms in the household.

In recent years, many households have had a number of so-called audio-visual (AV) devices such as a TV set, a video tape recorder (VTR), a digital versatile disc (DVD), recording/reproducing device, and an audio recording/reproducing system set up in each of their rooms.

Illustratively, common-use AV equipment may be installed in the living room and personal-use AV devices may be set up in each family member's room. These devices have become so ubiquitous that the family members, wherever they are in the household, can watch TV programs and enjoy contents reproduced from tapes, discs or other storage media.

Suppose that in the above setup, a person having entered a given room wants to watch a TV program. In such a case, the person operates conventionally a remote controller of the AV device in the room or suitable keys on the device to turn it on and select the desired TV channel.

However, it has been generally perceived that having to operate the AV device with its keys or with its remote controller every time a person enters a room is a bothersome chore.

SUMMARY OF THE INVENTION

The present invention has been made in view of the above circumstances and provides an electronic device controlling apparatus and an electronic device controlling system for controlling electronic devices such as AV equipment without requiring tedious operations.

In carrying out the invention and according to one aspect thereof, there is provided an electronic device controlling apparatus including: a communication unit for communicating with electronic devices; a storing element for storing personal identification information and personal information in correspondence with each other; a detecting element for detecting personal identification information and a location where a person identified by the detected personal identification information is present; a searching element for searching the storing element for the personal information corresponding to the personal identification information detected by the detecting element; and a controlling element which, based on the personal information searched for by the searching element, causes the communication unit to transmit a control signal to the electronic device installed in the detected location.

Where the above structure of the invention is in use, the detecting element first detects the location such as a room where the person identified by the personal identification information is present. The searching element then searches for the personal information corresponding to the personal identification information. Given the result of the search, the controlling element causes a corresponding control signal to be sent to the electronic device set up in the detected location.

In the inventive setup above, there is no need for performing specific operations on the electronic devices configured.

According to the invention, the electronic device in a room that a user happens to have entered is automatically brought into a state desired by that user.

Other objects, features and advantages of the present invention will become more apparent in the following specification and accompanying drawings.

According to the invention, as described above, each of the users need only present himself or herself where electronic devices are installed. The inventive arrangements then take over and place the electronic devices into a state preferred by the user in question without his or her intervention.

BRIEF DESCRIPTION OF THE DRAWINGS

FIG. 4 is a tabular view of typical personal profile information stored in a memory of the monitor control unit shown in FIG. 3;

FIG. 5 is a tabular view of typical priority information table held in the memory of the monitor control unit in FIG. 3;

FIG. 6 is a schematic view of a stay-in management information table stored in the memory of the monitor control unit in FIG. 3;

FIG. 27 is a tabular view of typical personal profile information used by an electronic device controlling system practiced as a fourth embodiment of the invention.

DETAILED DESCRIPTION OF THE PREFERRED EMBODIMENTS

Preferred embodiments of an electronic device controlling system according to the invention will now be described with reference to the accompanying drawings. The electronic device controlling system embodied as described hereunder constitutes illustratively a home network system.

The inventive system involves electronic devices such as a television (TV) set and an audio set (i.e., an audio component system or the like) installed in each of a plurality of rooms in the household, plus a monitor control unit set up in one of the rooms to control the configured electronic devices. The monitor control unit constitutes an electronic device controlling apparatus of this invention.

In this setup, each room is equipped with a personal information transmitting element for transmitting to the monitor control unit at least personal identification information about a person having entered the room in question.

The monitor control unit monitors reception of personal identification information coming from the personal identification information transmitting elements in the respective rooms so as to determine who has entered which room. The monitor control unit holds personal information about the family members, such as their tastes and preferences as well as their history of electronic device usages in the past. When a family member has entered a given room, the personal identification information transmitting element of the room sends to the electronic devices inside a control information corresponding to the family member in question.

[Overview of the First Embodiment of the Electronic Device Controlling System]

Figure 1:
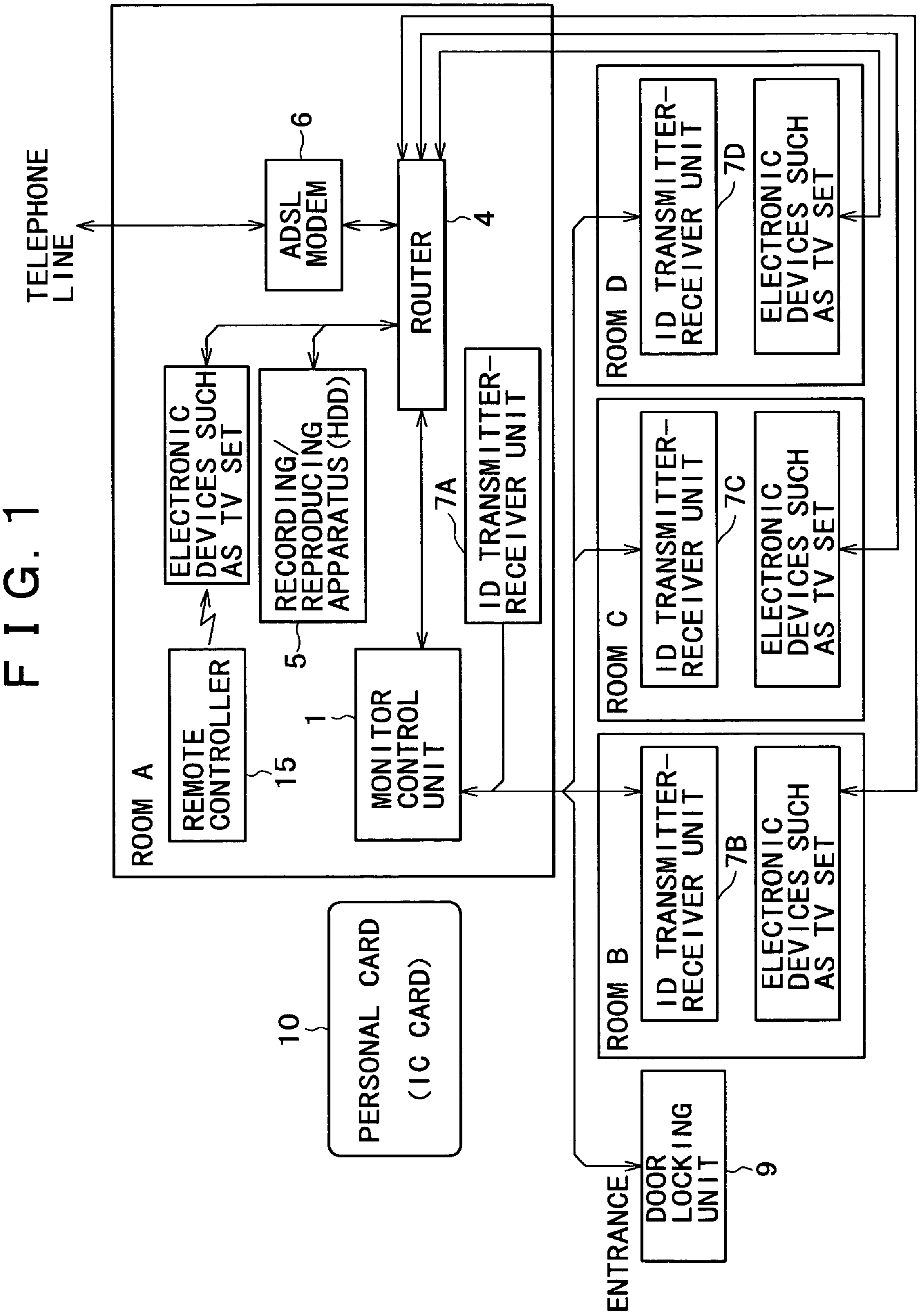
FIG. 1 is a schematic block diagram of an electronic device controlling system practiced as a first embodiment of the invention.
Figure 2:
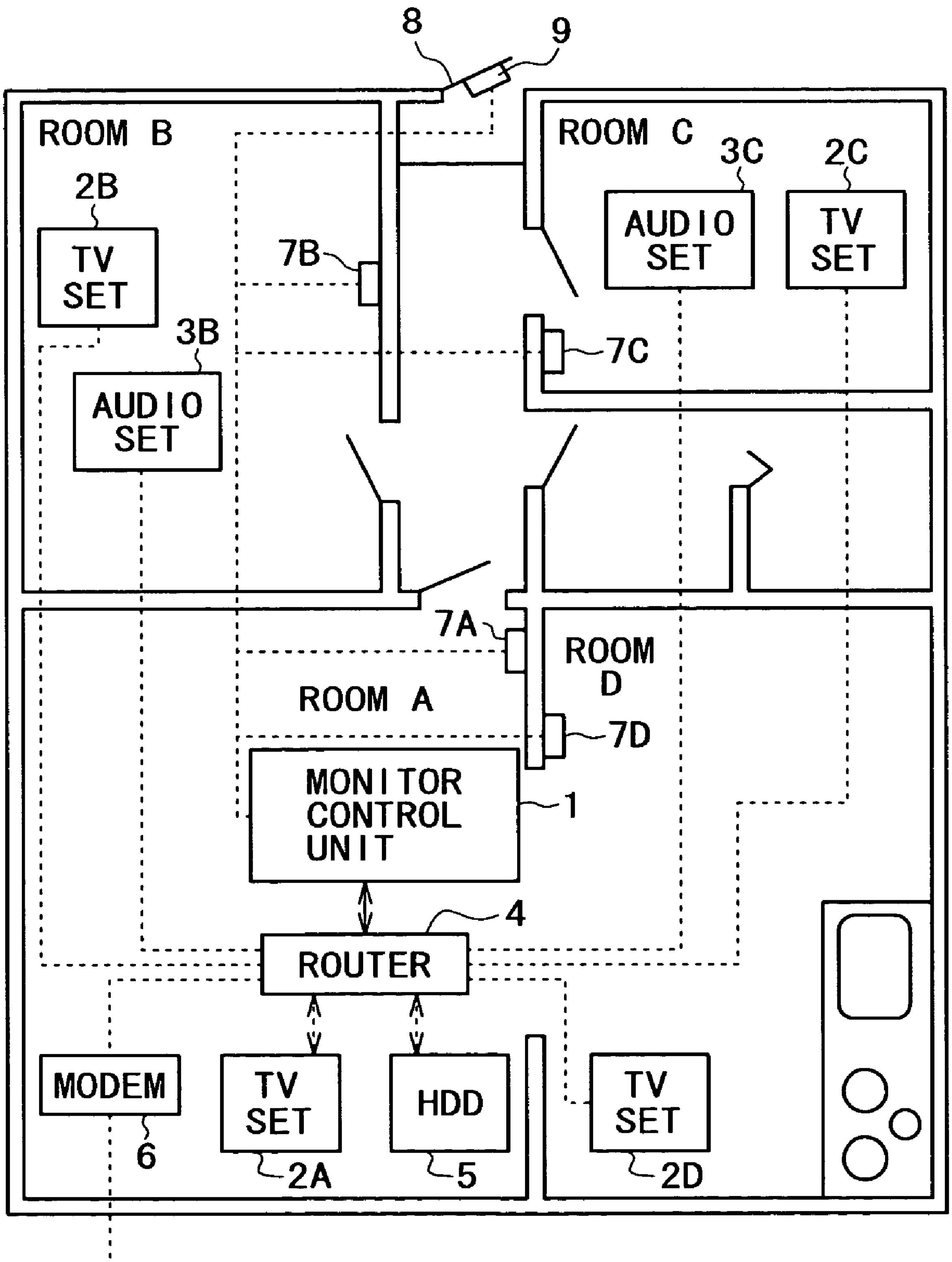
FIG. 2 is an explanatory view of the electronic device controlling system constituting the first embodiment.

FIGS. 1 and 2 are explanatory views of the electronic device controlling system practiced as the first embodiment of this invention and used as a home network system. FIG. 1 shows a typical network structure of the system, and FIG. 2 depicts how network components are configured in a typical arrangement of rooms in a house.

With the first embodiment, a room A serves as the living room that has a monitor control unit 1. Four rooms A, B, C and D have TV sets 2A, 2B, 2C and 2D respectively as typical electronic devices. The rooms B and C further possess audio sets 3B and 3C respectively.

In this example, the monitor control unit 1 communicates through a router 4 with the TV sets 2A, 2B, 2C and 2D in the rooms A, B, C and D as well as with the audio sets 3B and 3C.

Also in this example, the room A used as the living room has a hard disc drive 5 installed as a recording/reproducing unit. The hard disc drive 5 is connected through the router 4 to the monitor control unit 1 and to the TV set 2A. The router 4 is connected to a telephone line through an ADSL (Asymmetric Digital Subscriber Line) modem 6.

The rooms A, B, C and D have ID transmitter-receiver units 7A, 7B, 7C and 7D installed respectively as personal identification information transmitting elements connected to the monitor control unit 1. The ID transmitter-receiver units 7A, 7B, 7C and 7D communicate with an IC card (personal card) 10 possessed by each of the family members. Personal identification information acquired through communication from the IC card 10 by the ID transmitter-receiver unit 7A, 7B, 7C or 7D is sent to the monitor control unit 1.

The personal card 10 has a control IC (integrated circuit) embedded inside. The control IC includes a memory that stores at least personal identification information (personal ID) about the person who owns the card in question. The memory may also accommodate personal information, to be described later.

In this example, the control IC in the personal card 10 may communicate with each of the ID transmitter-receiver units 7A, 7B, 7C and 7D in non-contact fashion, such as through the use of electromagnetic induction or radio signals. In this case, as will be described later, communications between the ID transmitter-receiver units 7A, 7B, 7C and 7D on the one hand and the personal card 10 on the other hand are performed by means of electromagnetic induction.

The first embodiment of the invention involves a door locking unit 9 attached to a front door 8. In this example, the door locking unit 9 communicates with the personal card 10 in the same manner as the ID transmitter-receiver units 7A, 7B, 7C and 7D. Based on the communications thus carried out, the door locking unit 9 locks and unlocks the door 8.

In this example, the door locking unit 9 is connected communicably to the monitor control unit 1. As with the ID transmitter-receiver units 7A, 7B, 7C and 7D, the door locking unit 9 is capable of sending to the monitor control unit 1 the personal ID acquired from the personal card 10 through communication.

Key information for controlling the locking and unlocking actions on the door may be stored in the memory of the personal card 10 as common key information for all family members of the household. In this case, the common key information is registered beforehand with the door locking unit 9. Illustratively, the door locking unit 9 may authenticate the common key information received from a personal card 10 through communication, or may transfer the received key information to the monitor control unit 1 for authentication. After successful authentication, the door locking unit 9 may lock or unlock the door.

In this example, the key information used in conjunction with the door locking unit 9 is not the common key information mentioned above but personal IDs representing the family members of the household. This is an improvement over the conventional setup because the inventive scheme can check and manage the entries and exits of every family member into and from the house through the front door.

In practice, the personal IDs of all family members of the household are registered beforehand with the door locking unit 9 or with some other device in charge of key information authentication. The door locking unit 9 is equipped with a receiving element for receiving the personal ID from each personal card 10 through communication. Given the received personal ID, either the door locking unit 9 itself authenticates the personal ID as key information, or transfers the received ID to the appropriate key authentication device for authentication. After successful authentication, the door locking unit 9 locks or unlocks the front door.

As described, the personal IDs acquired from the personal card 10 through the ID transmitter-receiver unit 7A, 7B, 7C or 7D or via the door locking unit 9 allow the monitor control unit 1 to verify who has entered or exited the house through the front door, and who is in which room in the house.

The rooms A, B, C and D are each furnished with a remote controller 15. The remote controller 15 is used to control remotely the electronic devices such as the TV sets 2A, 2B, 2C and 2D installed in the respective rooms of the house.

[Typical Structure of the Monitor Control Unit]

Figure 3:
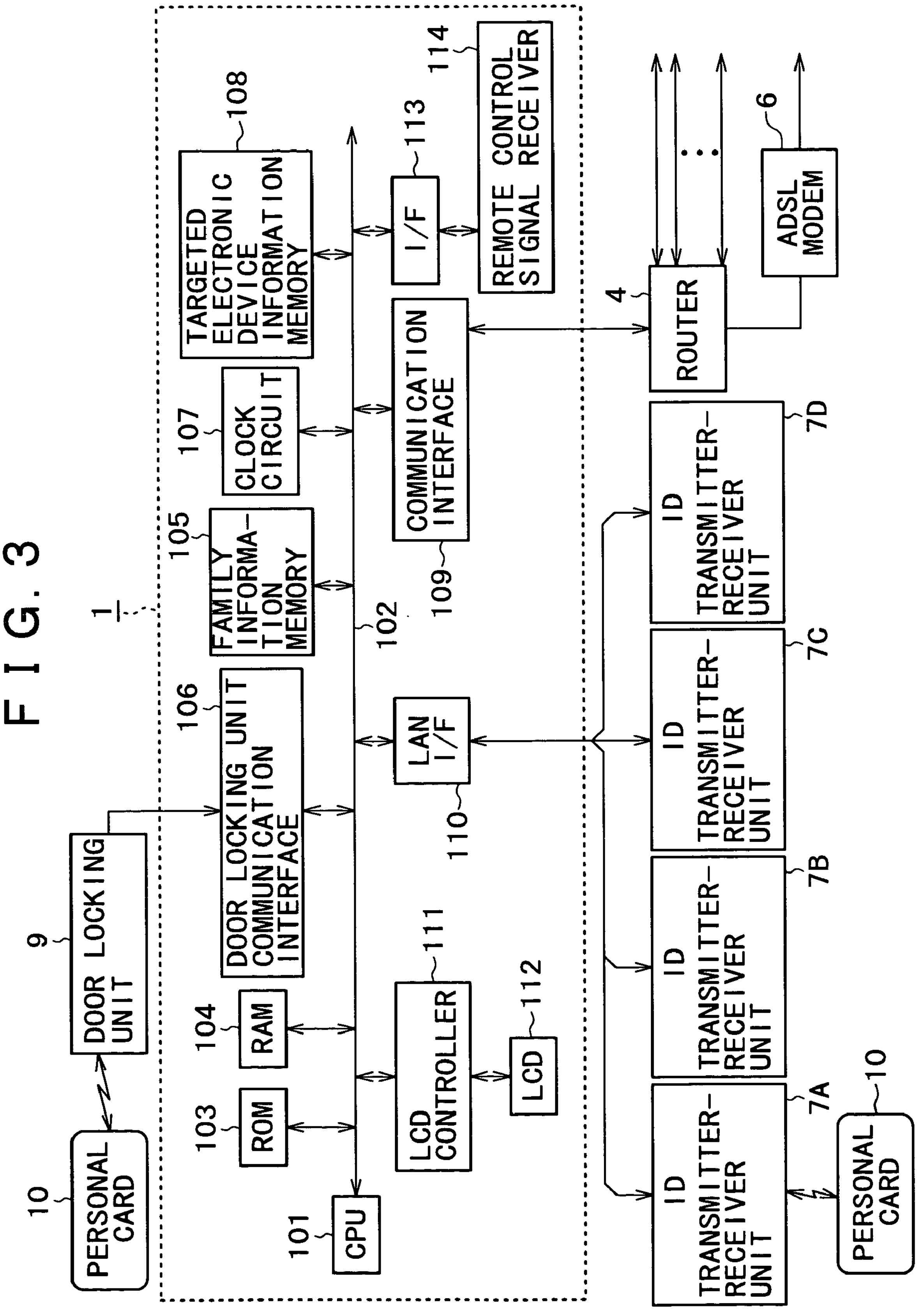
FIG. 3 is a schematic block diagram of a monitor control unit used by the electronic device controlling system constituting the first embodiment.

FIG. 3 shows how the monitor control unit 1 is typically structured inside and how the monitor control unit 1 is connected illustratively to peripheral devices.

The monitor control unit 1 has a microcomputer structure. In the monitor control unit 1, a CPU (Central Processing Unit) 101 is connected through a system bus 102 to: a ROM (Read Only Memory) 103 that contains programs and data; a work-area RAM (Random Access Memory) 104; a family information memory 105 that holds personal IDs and personal information about all family members possessing the personal card 10 each; a door locking unit communication interface 106 for communicating with the door locking unit 9; a clock circuit 107 that keeps the current time and provides necessary timer controls; a targeted electronic device information memory 108; a communication interface 109 for conducting communications through the router 4; and a LAN interface 110 for communicating with the ID transmitter-receiver units 7A, 7B, 7C and 7D in stalled in the rooms A, B, C and D respectively.

The system bus 102 is connected to an LCD (Liquid Crystal Display) 112 through an LCD controller 111. The system bus 102 is further connected through an interface 113 to a remote control signal receiver 114 that receives signals from the remote controller 15.

The family information memory 105 is illustratively constituted by an EEPROM (Electrically Erasable Programmable ROM). This memory accommodates personal profile information about all family members.

FIG. 4 indicates typical personal profile information about one person. As shown in FIG. 4, personal profile information is made up of a personal ID (identification information) and personal information stored in correspondence with each other.

The personal ID is illustratively composed of a 12-digit number which, in this example, is divided into two parts of a plurality of digits each. One ID number part is common to all family members; the other ID number part is specific to each individual for personal identification purposes. The personal ID is not limited to the format above; it may be completely different from one member to another within the same family, the ID being a combination of numerals, alphabetic characters, symbols and others of a plurality of digits.

In the example of FIG. 4, the personal information stored in the family information memory 105 includes: the person's password information, name, address, date of birth, age, relation to other members, date of registration, bank account number, make of car owned, tastes and preferences, and entry/exit history information about the person's entries and exits through the front door 8.

The tastes and preferences may illustratively include the category of favorite TV programs (e.g., dramas, sports, documentaries), category of favorite music (e.g., jazz, pop music, classical music), and category of favorite movies (e.g., romantic comedies, period dramas, SF, action films). Although not shown in FIG. 4, the person's hobby such as fishing or golf may also be included.

The entry/exit history information includes the times of day at which the person in question entered and exited the house, as well as a present/absent flag indicating whether the person is in or out of the house at any point in time. The entry/exit history information is used by the monitor control unit 1 to check and manage the entries and exits of the family members into and from the house through the front door 8.

With the first embodiment of this invention, the family information memory 105 contains priority information about each family member with regard to the electronic devices installed. That is, the priority information specifies the order of priority for the family members in using each electronic device. For example, each family member is granted a different degree of priority in selecting a preferred channel on the TV set.

The priority information may be common to all electronic devices or may be set individually for each electronic device. The priority information may be determined by the person's age, by the time zone of the day, and by the day of the week. If the targeted electronic device is a TV set, a radio receiver, or other broadcast receiving equipment, the priority information may be determined additionally by program category and by sponsor.

FIG. 5 shows typical priority information determined in common for all electronic devices. This is an example in which different degrees of priority are set for three family members, i.e., a father, a mother and a child, and in which the smaller the priority number, the higher the order of priority.

Obviously, the information in the priority information table of FIG. 5 may also be stored in a memory other than the family information memory 105.

As will be discussed later, the monitor control unit 1 references the personal profile information and priority information in the family information memory 105 when controlling the electronic devices installed in the different rooms of the house. Using the referenced information, the monitor control unit 1 generates signals for controlling the electronic devices accordingly.

Furthermore, the family information memory 105 contains stay-in management information indicating who is staying in which room at present. The stay-in management information may also be referenced by the monitor control unit 1 for control over the electronic devices.

FIG. 6 indicates a typical stay-in management information table stored in the family information memory 105. What is shown in FIG. 6 is an example in which a plurality of digits for personal identification in each personal ID are used as stay-in person information. In this example, a two-digit number is used for personal identification of each family member for purpose of simplification and illustration. In the table of FIG. 6, a room marked with a personal ID number is deemed occupied by the person identified by the number, and rooms with no personal ID number written are considered unoccupied. In this example, the father and child stay in the room A while the mother is in the room D, and the rooms B and C are not occupied.

The door locking unit communication interface 106 is designed to receive personal ID information from the door locking unit 9, as will be described later.

The monitor control unit 1 grasps the current time from the time information provided by the clock circuit 107. By referencing the priority information mentioned above, the monitor control unit 1 determines the priority of each family member at that point in time.

The targeted electronic device information memory 108 holds information about the electronic devices targeted for control and arranged in each of the rooms A, B, C and D. The electronic device information retained in the memory 108 includes identification information (device IDs) about each of the electronic devices configured and information about the types and functionalities of these devices.

The communication interface 109 in this example is connected to the router 4. The router 4 is in turn connected not only to the electronic devices installed in the rooms A, B, C and D but also to the telephone line through the ADSL modem 6, as discussed above.

[Typical Structure of the Personal Card 10]

Figure 7A:
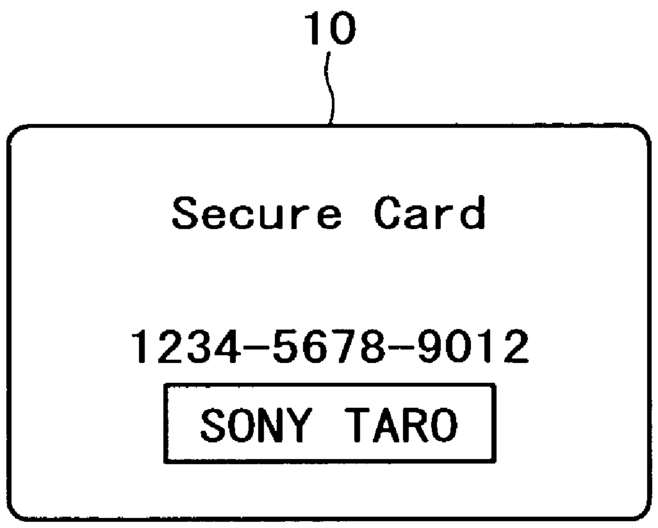
FIGS. 7A and 7B are schematic views of a personal card used by the electronic device controlling system constituting the first embodiment.
Figure 7B:
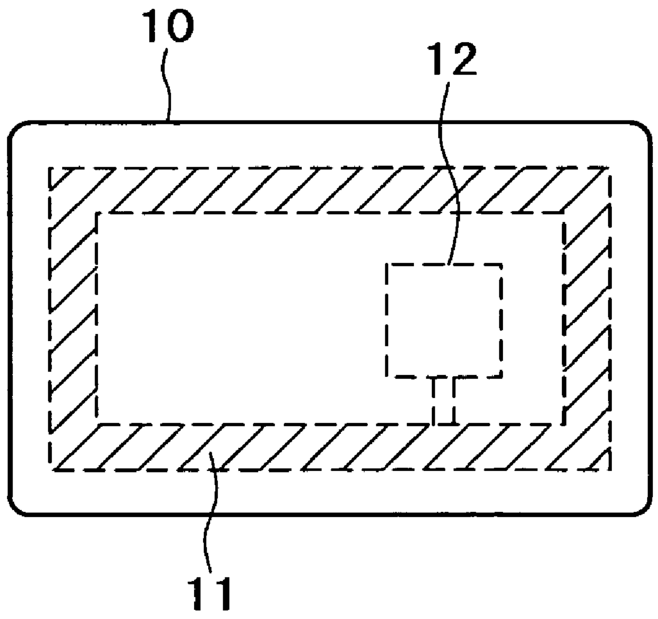

The personal card 10 will now be described. FIGS. 7A and 7B illustrate a typical structure of the personal card 10 used by the first embodiment of this invention. FIG. 7A shows the front side of the personal card 10 bearing the card owner's name and ID number.

FIG. 7B shows an internal structure of the personal card 10. As indicated, the card 10 incorporates an electromagnetic induction antenna 11 and a control IC 12 for communicating with the ID receiver-transmitter units 7A through 7D and with read/write units in the door locking unit 9.

The control IC 12 contains a CPU and a memory. The memory retains the card owner's name, personal ID, and other personal information, i.e., the personal profile information mentioned above.

The memory in the control IC 12 further admits entries of historical information about communications between the card owner on the one hand and the ID transmitter-receiver units 7A, 7B, 7C and 7D as well as the door locking unit 9 on the other hand, i.e., logs including the times of day at which the card owner entered and exited any of the rooms and the house itself. Such historical information is also stored in the family information memory 105 of the monitor control unit 1.

[Typical Structure of the ID Transmitter-receiver Units 7A, 7B, 7C and 7D]

Described below is a typical structure of the ID transmitter-receiver units 7A, 7B, 7C and 7D that read information from the personal card 10. These units are designed to check the entries and exists of every family member into and from each of the rooms in the house.

Figure 8:
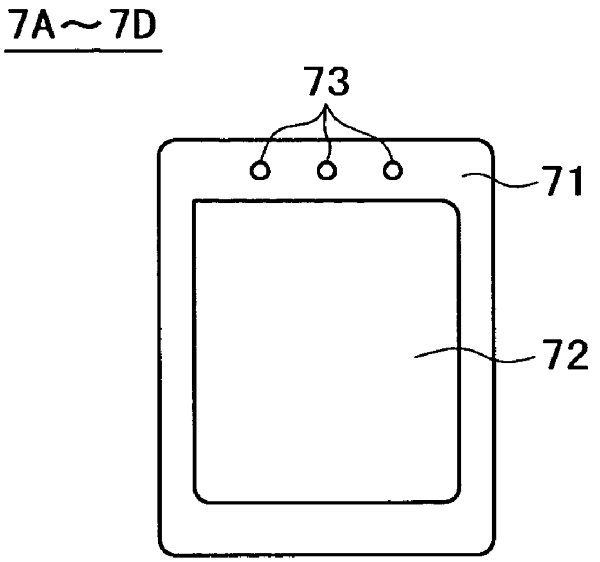
FIG. 8 is a schematic view of an ID transmitter-receiver unit used by the electronic device controlling system constituting the first embodiment.
Figure 9:
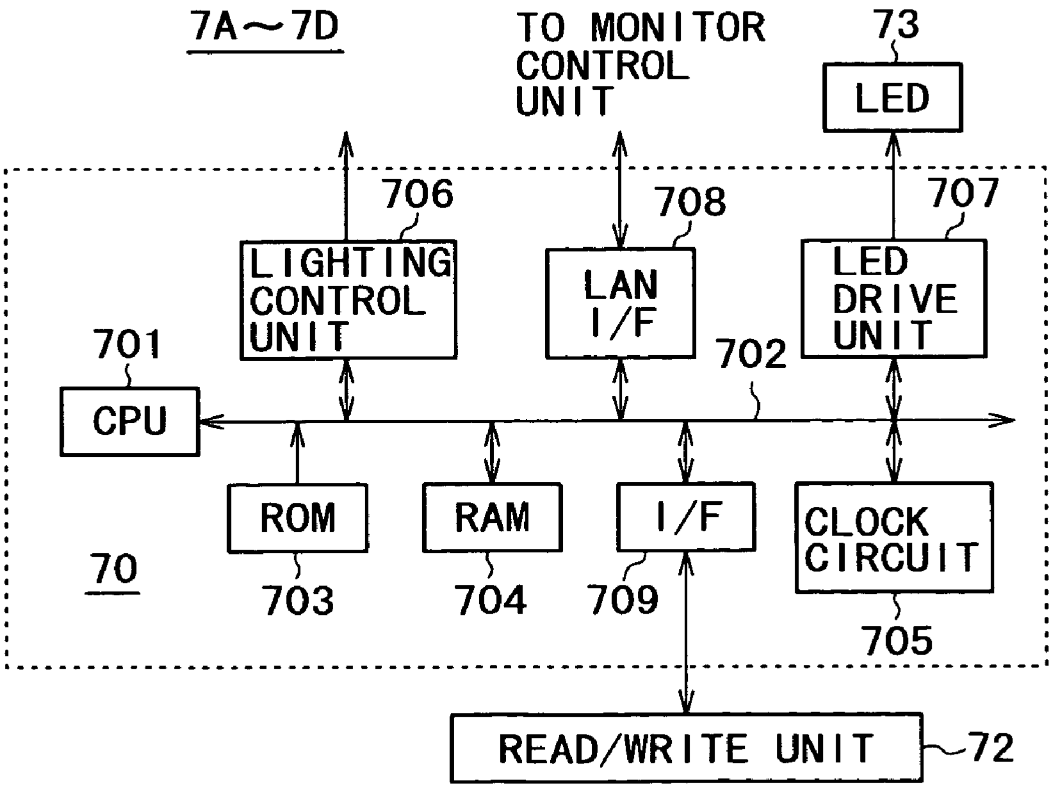
FIG. 9 is a schematic block diagram of the ID transmitter-receiver unit used by the electronic device controlling system constituting the first embodiment.

FIG. 8 gives an external view of each of the ID transmitter-receiver units 7A, 7B, 7C and 7D. FIG. 9 is a schematic block diagram showing a typical structure of this ID transmitter-receiver unit. Since the ID transmitter-receiver units 7A, 7B, 7C and 7D are structurally identical, FIGS. 8 and 9 deal with a single ID transmitter-receiver unit.

Each of the ID transmitter-receiver units 7A, 7B, 7C and 7D doubles as a switch panel of the light fixtures for the rooms A, B, C and D, the panel being attached to the wall of each room. When the personal card 10 is held onto any one of the ID transmitter-receiver units 7A, 7B, 7C and 7D, the transmitter-receiver unit in question acquires a personal ID from the card 10 and transmits the acquired ID to the monitor control unit 1 while turning the lighting fixtures on or off.

As shown in FIG. 8, each of the ID transmitter-receiver units 7A, 7B, 7C and 7D has a panel face 71 furnished with a read/write unit 72 and a plurality of LEDs (light-emitting diodes) 73. The panel face 71 is attached to the wall surface. The read/write unit 72 serves to communicate with the personal card 10, while the LEDs 73 are illuminated illustratively to inform the user of the status of data retrieval from the personal card 10.

In this example, the panel face 71 of the ID transmitter-receiver unit 7A, 7B, 7C or 7D is rectangular in shape similar to the personal card 10 but is slightly larger than the latter. The greater size of the panel face 71 is intended to ensure reliable communications with the personal card 10.

Each of the ID transmitter-receiver units 7A, 7B, 7C and 7D is equipped with a control unit 70 made of a microcomputer as shown in FIG. 9. In this control unit 70, a CPU 701 is connected via a system bus 702 to a ROM 703, a RAM 704, a clock circuit 705, a lighting control unit 706, an LED drive unit 707, a LAN interface 708, and an interface 709. The LAN interface 708 is designed to communicate with the monitor control unit 1, and the interface 709 provides connection to the read/write unit 72.

Through the use of electromagnetic induction, the read/write unit 72 reads data from the personal card 10 held onto it and feeds the retrieved data to the control unit 70. The read/write unit 72 also writes data coming from the control unit 70 to the personal card 10.

Furthermore, the control unit 70 exchanges data with the monitor control unit 1 through the interface 709, and causes the LED drive unit 707 to turn on, turn off, or blink the LEDs 73 individually.

[Typical Structure of the Door Locking Unit 9]

Described below in detail is how the door locking unit 9 is structured and how it works illustratively. For this example, it is assumed that the authentication of key information based on a personal ID is performed by the door locking unit 9 itself. Alternatively, the monitor control unit 1 may receive key information from the door locking unit 9, authenticate the received information, and send to the door locking unit 9 the result of the authentication.

[Structure of the Door Locking Unit]

Figure 10B:
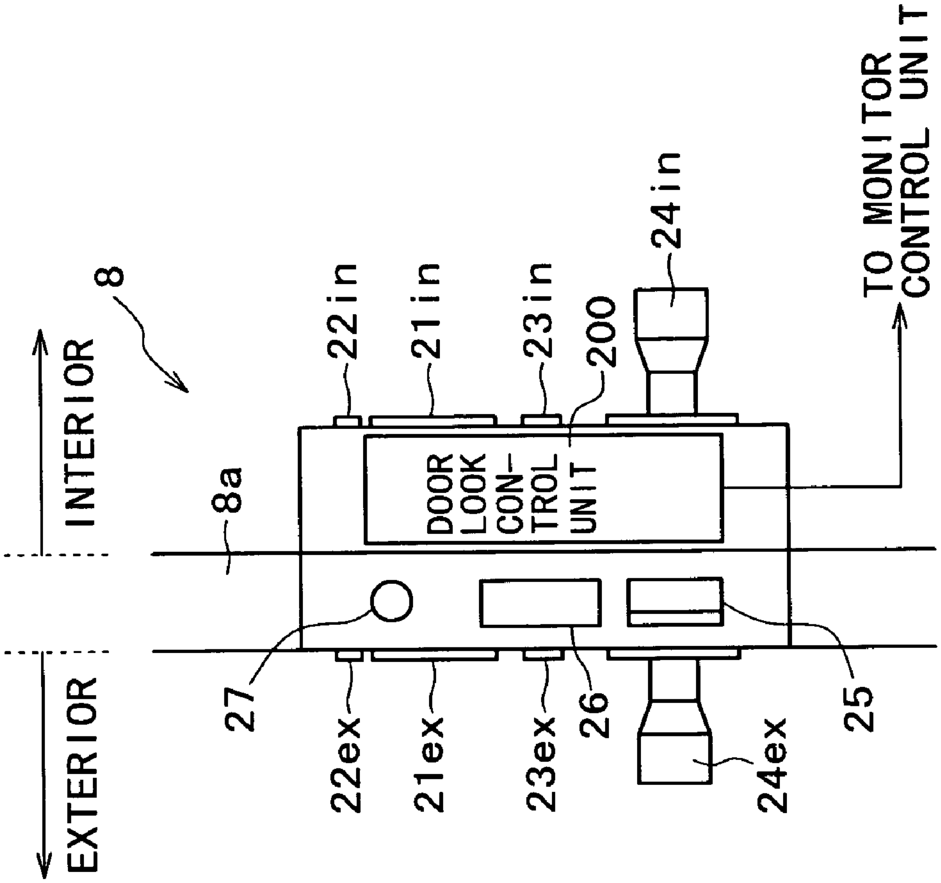
FIGS. 10A and 10B are schematic views of a door locking unit used by the electronic device controlling system constituting the first embodiment.
Figure 10A:
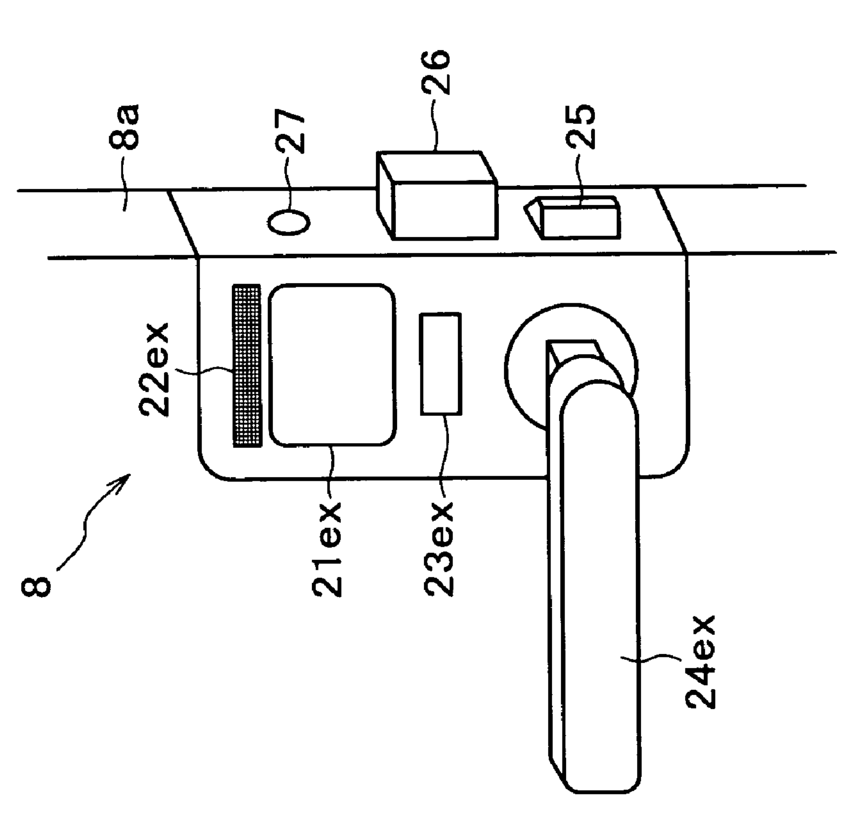

FIGS. 10A and 10B are schematic views sketching a typical structure of the door locking unit 9. FIG. 10A shows fittings of the door locking unit 9 on the front door 8 as viewed from outside the house. FIG. 10B indicates the fittings of the door locking unit 9 as seen from an edge of the front door 8.

The door locking unit 9 of this example has on its exterior side an exterior read/write unit 21*ex*, an exterior LED (light-emitting diode) 22*ex*, an exterior speaker 23*ex*, and an exterior door knob 24*ex*. The exterior read/write unit 21*ex* communicates with the personal card 10. The exterior LED 22*ex* serves as a display device showing visually the result of authentication of the key information from the personal card 10, as well as the locked or unlocked state of the front door 8. The exterior speaker 23*ex* announces audibly the result of authentication of the key information from the personal card 10 in addition to the locked or unlocked state of the front door 8.

On the inside of the front door 8 (i.e., indoors), the door locking unit 9 has an interior read/write unit 21*in*, an interior LED (light-emitting diode) 22*in*, an interior speaker 23*in*, and an interior door knob 24*in*. The interior read/write unit 21*in* communicates with the personal card 10. The interior LED 22*in* acts as a display device indicating visually the result of authentication of the key information from the personal card 10, as well as the locked or unlocked state of the front door 8. The interior speaker 23*in* announces audibly the result of authentication of the key information from the personal card 10 in addition to the locked or unlocked state of the front door 8.

The front door 8 is also provided with a front door catch 25, a locking catch 26, and a door closure sensor 27. The inside of the front door 8 has a door lock control unit 200 for controlling the workings of the door locking unit 9. The door lock control unit 200 is connected to the electronic key read/write units 21*ex* and 21*in*, the LEDs 22*ex* and 22*in*, the speakers 23*ex* and 23*in*, the door closure sensor 27, and a door locking mechanism drive unit (not shown).

The front door catch 25 is slid elastically in a direction perpendicular to an edge 8*a* of the front door 8 in response to the manipulation of the door knob 24*ex* or 24*in*. With the front door 8 left open, the catch 25 is projected externally by a built-in spring member as shown in FIG. 10A. As the front door 8 is being closed, the catch 25 is pushed into the door 8 against a biased force of the spring member inside. When the front door 8 is completely closed, the biased force of the spring member pushes the catch 25 snugly into a concave portion in the wall opposite to the edge 8*a* of the door 8. In this manner, the front door 8 is held in place by the catch 25 when closed completely.

Even if the front door 8 is unlocked with auto lock mode disabled (as will be described later), the door 8 is still held in place by the catch 25 fitting into the concave portion in the wall opposite to the edge 8*a* of the door 8.

The locking catch 26 is one of the members constituting the door locking mechanism. When the front door 8 is locked by the door locking mechanism drive unit (not shown in FIG. 10A or 10B) actuating the door locking mechanism, the locking catch 26 is slid into a projected position in a direction perpendicular to the edge 8*a* of the door 8 as shown in FIG. 10A; when the front door 8 is unlocked by the door locking mechanism drive unit actuating the door locking mechanism, the locking catch 26 is set to a retracted position, i.e., flush with the edge 8*a* of the door 8.

Although not shown in FIG. 10A or 10B, the concave portion for engaging with the projected locking catch 26 is formed in the wall opposite to the edge 8*a* of the door 8. The front door 8 is locked when the locking catch 26 fits into the concave portion; the door 8 is unlocked when the locking catch 26 is retracted into the door 8 out of the concave portion in the wall.

The front door closure sensor 27 is illustratively an optical sensor. When the front door 8 is opened, the sensor 27 detects an opened-door state by sensing exterior light; when the front door 8 is closed, the sensor 27 detects a closed-door state by sensing the absence of exterior light with the door edge 8*a* coming into contact with the wall.

[Explanation of the Door Lock Control Unit 200]

Figure 11:
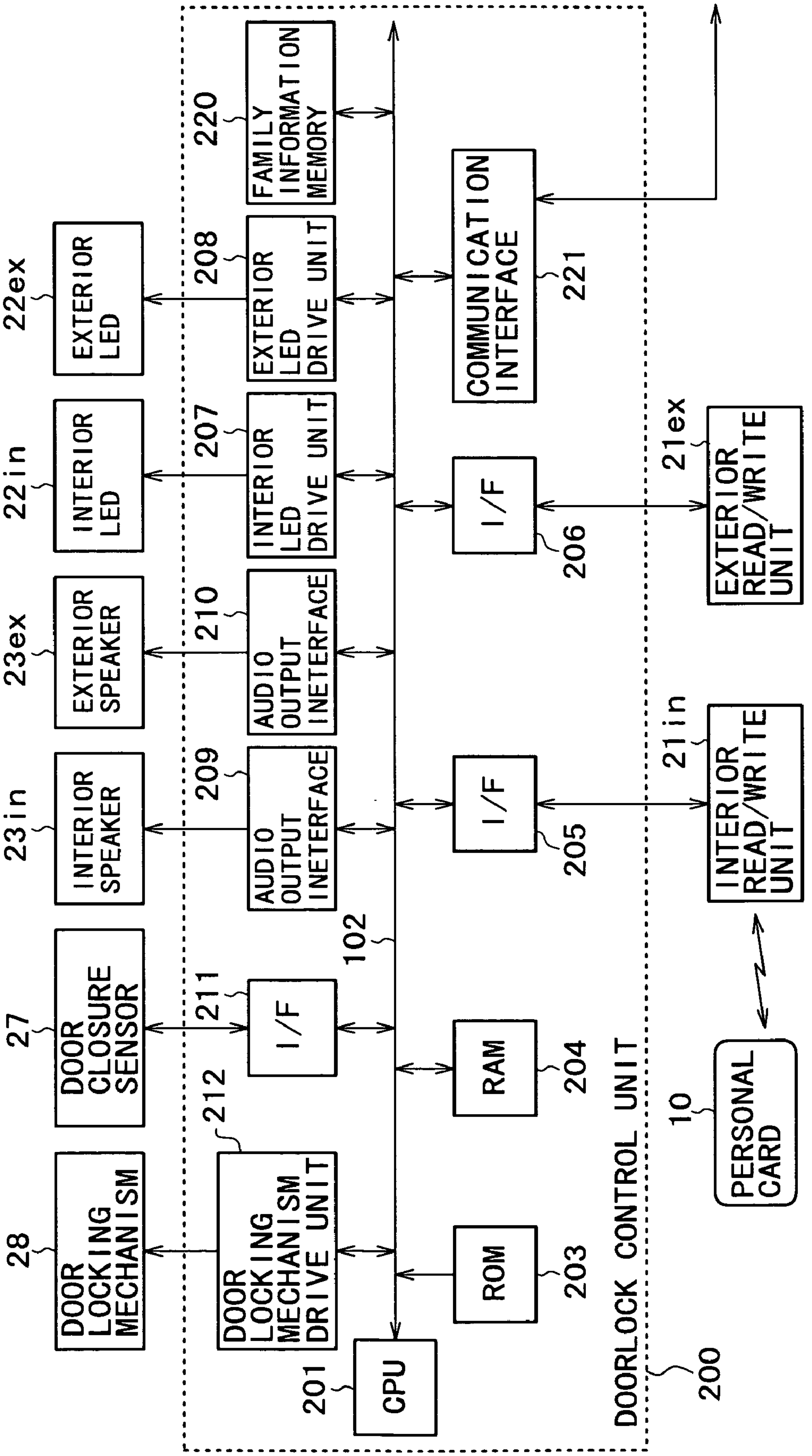
FIG. 11 is a schematic block diagram of the door locking unit used by the electronic device controlling system constituting the first embodiment.

FIG. 11 shows an electrical structure of the door locking unit 9 centering on the door lock control unit 200. The door lock control unit 200 has a microcomputer structure. In the control unit 200, a CPU 201 is connected via a system bus 202 to a ROM 203, a work-area RAM 204, a family information memory 220, and a communication interface 221. The ROM 203 stores programs and data. The family information memory 220 accommodates personal IDs constituting key information. The communication interface 221 serves to communicate with the monitor control unit 1.

The family information memory 220 contains beforehand as electronic key information the personal IDs that are held in the personal card 10 owned by each family member opening and closing the front door 8. The family information memory 220 also retains each family member's (or resident's) age, sex, relation to other family members, and other personal information.

The system bus 202 is connected to the interior read/write unit 21*in* and exterior read/write unit 21*ex* through interfaces 205 and 206 respectively, to the interior LED 22*in* through an interior LED drive unit 207, to the exterior LED 22*ex* through an exterior LED drive unit 208, to the interior speaker 23*in* through an audio output interface 209, and to the exterior speaker 23*ex* through another audio output interface 210.

The system bus 202 is also connected to the door closure sensor 27 through an interface 211, and to the door locking mechanism 28 through a door locking mechanism drive unit 212; the door locking mechanism 28 serves to slide the locking catch 26 into and out of its locked position.

The read/write units 21*ex* and 21*in* constitute a communication unit that communicates with the personal card 10 by use of electromagnetic induction.

The door lock control unit 200 of this example has two door lock control modes: auto lock mode, and successive lock mode.

In the auto lock mode, the door lock control unit 200 unlocks the front door 8 by communicating with a presented personal card through the read/write units 21*ex* and 21*in*, and locks the door automatically upon elapse of a predetermined period of time. In the auto lock mode, the exterior and interior read/write units 21*ex* and 21*in* are always used.

In the successive lock mode, the door lock control unit 200 turns the front door 8 from the currently locked state to an unlocked state or vice versa by communicating with the personal card at least through the exterior read/write unit 21*ex*. Although it is possible to use both the exterior and the interior read/write units 21*ex* and 21*in* in the successive lock mode, a manual locking action may take the place of the interior read/write unit 21*in*. In this case, the door lock control unit 200 locks and unlocks the front door 8 by communicating with the personal card only through the exterior read/write unit 21*ex*. The successive lock mode is designed to emulate the traditional way of locking and unlocking the door.

In this example, the worker installing the door locking unit 9 can make arrangements through the monitor control unit 1 in order to select either the auto lock mode or the successive lock mode as the door lock control mode for the door locking unit 9.

Information specifying the door lock control mode (i.e., one of the two options) is held in a nonvolatile memory, not shown, in the door lock control unit 200. By referencing the information set in that nonvolatile memory, the door lock control unit 200 recognizes its door lock control mode either as the auto lock mode or as the successive lock mode. How the door lock control mode is set through the monitor control unit 1 will be discussed later.

The selection of either the auto lock mode or the successive lock mode as the door lock control mode for the door locking unit 9 can be set directly on the door locking unit 9 instead of through the monitor control unit 1. For example, upon shipment of the door locking unit 9 from the factory, one of the two door lock control modes may be set on the unit 9. Alternatively, the door locking unit 9 may be furnished with a suitable inputting element such as a DIP switch that allows the worker installing the unit 9 to set the selected door lock control mode.

What follows is a description of how the door locking unit 9 works in each of the auto lock mode and successive lock mode. The steps in the applicable flowcharts cited below are carried out primarily by the CPU 201 of the door lock control unit 200.

[Auto Lock Mode; FIGS. 12 through 15]

The workings of the door locking unit 9 in the auto lock mode will now be described by referring to the flowcharts of FIGS. 12 through 15. With the auto lock mode in effect, the front door 8 is usually locked. The personal card 10 is first held onto the interior or exterior read/write unit 21*in* or 21*ex* so that communication will take place between the two units. When the personal ID from the personal card 10 is authenticated, the door lock control unit 200 unlocks the front door 8 for a predetermined period of time and locks it again at the end of that period.

The CPU 201 monitors the interior and exterior read/write units 21*in* and 21*ex* through the interfaces 205 and 206 respectively, and waits for a personal card 10 to be held onto the interior or exterior read/write unit 21*in* or 21*ex* so that communications will take place therebetween (in step S1).

If in step S1 the personal card 10 is held onto the read/write unit with communications effected therebetween, the CPU 201 receives personal information including a personal ID from the personal card 10 and temporarily stores the retrieved information into, say, the RAM 204 (in step S2). At this point, the personal card 10 is fed with time information from a clock circuit (not shown) in the door lock control unit 200; the information is written to the memory in the control IC 12. Also written to the memory in the control IC 12 is a component ID or other relevant information coming from and indicative of either the interior read/write unit 21*in* or the exterior read/write 21*ex* as the unit with which the personal card 10 has communicated.

The CPU 201 determines which of the interior and exterior read/write units 21*in* and 21*ex* has communicated with the personal card 10 (in step S3). The result of the determination, together with the above-mentioned time information in effect upon communication, is written to the family information memory 220, specifically into a recording area of the family member corresponding to the personal ID read from the personal card. The information is also transferred to the monitor control unit 1 for storage into the family information memory 205 therein.

Figure 12:
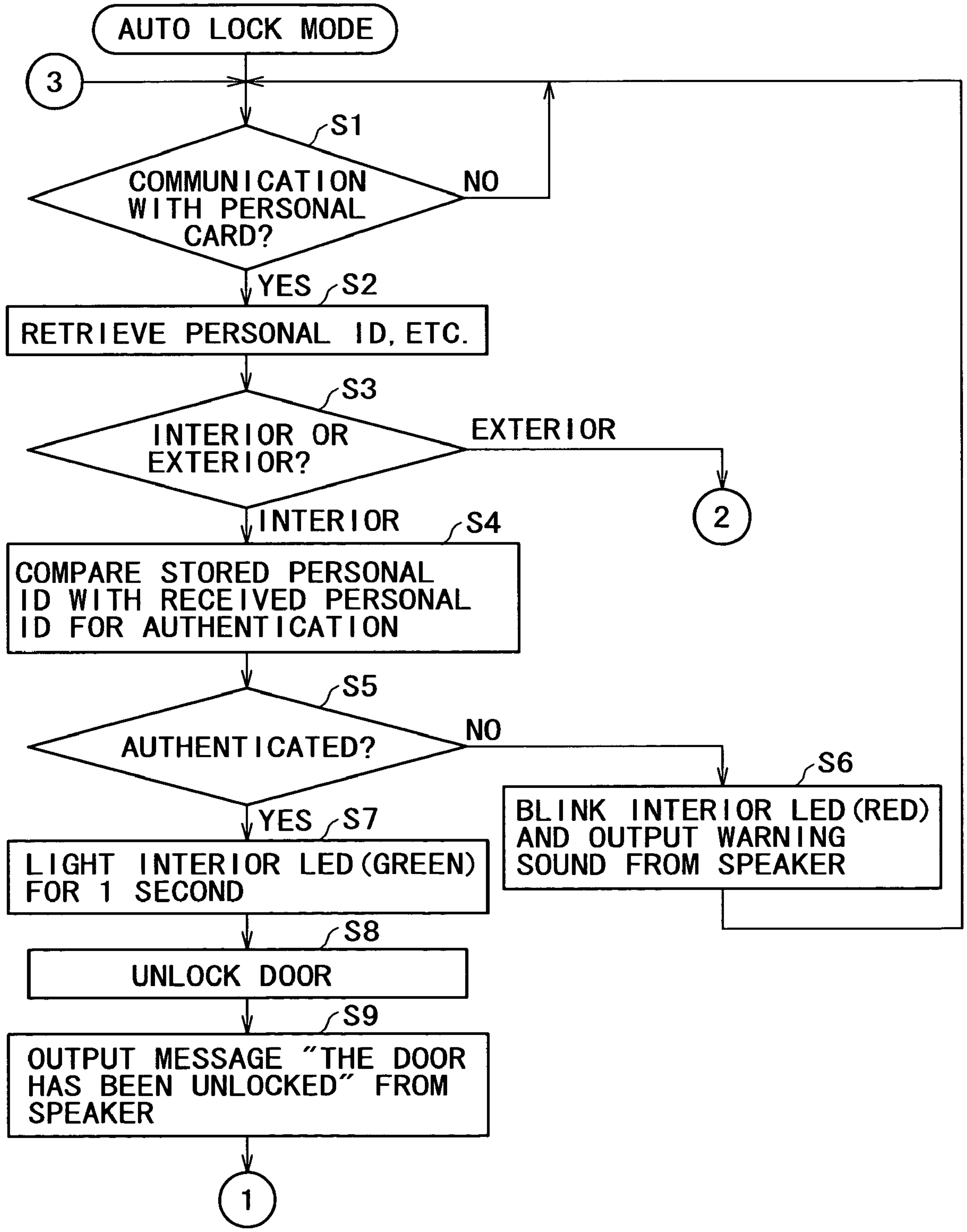
FIG. 12 is a flowchart of steps performed by the door locking unit used by the electronic device controlling system constituting the first embodiment.
Figure 13:
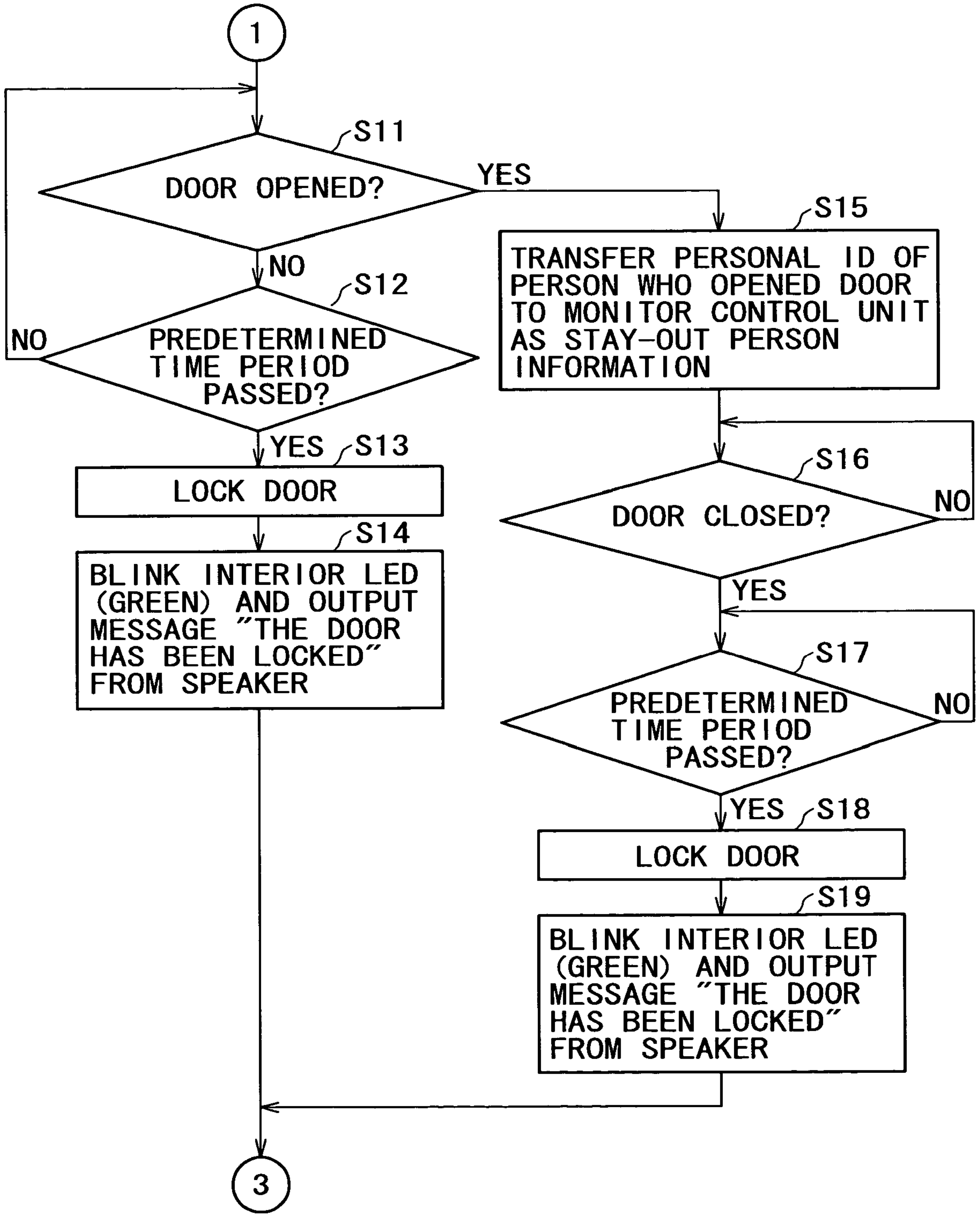
FIG. 13 is another flowchart of steps performed by the door locking unit used by the electronic device controlling system constituting the first embodiment.

[In the Case of Communication with the Interior Read/Write Unit 21*in*; FIGS. 12 and 13]

If in step S3 the interior read/write unit 21*in* is found to have communicated with the personal card 10, the CPU 201 determines that a stay-in person with the card is leaving the house. In that case, the CPU 201 proceeds to carry out the following process:

The CPU 201 first compares the personal IDs in the family information memory 220 with the personal ID received from the personal card 10 to see if there is a match. That is, the CPU 201 authenticates the personal card 10 in question by determining whether the card has already been registered with the door locking unit 9 (in step S4).

The CPU 201 checks to see if the authentication is successful (in step S5). If none of the personal IDs held in the family information memory 220 coincides with the personal ID retrieved from the personal card 10, the CPU 201 determines that the authentication has failed (NG). In this case, the CPU 201 causes the interior LED drive unit 207 to blink the interior LED 22*in* in red and the interior speaker 23*in* to output a warning sound, thereby informing the user of the personal card 10 that the authentication has failed (in step S6). The door locking mechanism 28 is left in its locked state, and control is returned to step S1.

If in step S5 one of the personal IDs in the family information memory 220 matches the personal ID received from the personal card 10, the CPU 201 determines that the authentication is successful (OK). In this case, the CPU 201 causes the interior LED drive unit 207 to light the interior LED 22*in* in green for one second, thereby informing the user of the personal card 10 that the card has been authenticated (in step S7). At this point, the CPU 201 may cause the interior speaker 23*in* to output an audible message "Your card has been authenticated."

With the authentication successfully terminated, the CPU 201 drives the door locking mechanism drive unit 212 in a manner causing the door locking mechanism 28 to unlock the front door 8 (in step S8). The CPU 201 then causes the interior speaker 23*in* to output an audible message "The door has been unlocked" (in step S9). At this point, the CPU 201 may cause the interior LED 22*in* to blink illustratively in green, informing the user of the personal card 10 that the front door has been unlocked.

The CPU 201 determines that the user of the personal card 10 (i.e., a stay-in person) is on the point of leaving the house, having recognized that the front door 8 has been unlocked from inside by use of the personal card 10.

The CPU 201 then admits a sensor output of the door closure sensor 27 through the interface 211, to see if the front door 8 is opened (in step S11). The CPU 201 determines whether a predetermined time period (e.g., 10 seconds) has elapsed without the front door 8 being opened (in step S12). Upon elapse of the predetermined time period (e.g., after 10 seconds), the CPU 201 automatically locks the front door 8 (in step S13). The CPU 201 causes the interior LED 22*in* to blink in green, indicating that the front door 8 is locked again (in step S14).

If in step S11 the front door 8 is found to be opened within 10 seconds of the unlocking in step S8, the CPU 201 determines that the stay-in person identified by the personal ID received in step S2 has left the house. In that case, the CPU 201 transfers to the monitor control unit 1 personal information including the personal ID as stay-out person information (in step S15).

The CPU 201 confirms that the front door 8 is closed by referencing the sensor output from the door closure sensor 27 (in step S16). If a predetermined time period (e.g., 3 seconds) is found to have elapsed after the front door 8 was closed (in step S17), the CPU 201 drives the door locking mechanism drive unit 212 in a manner causing the door locking mechanism 28 to lock the front door 8 (in step S18). The CPU 201 causes the exterior LED 22*ex* to blink in green, indicating that the front door 8 is locked again (in step S19). The exterior LED 22*ex* is allowed to blink for a predetermined period of time (e.g., 10 seconds). Control is then returned to step S1.

Figure 14:
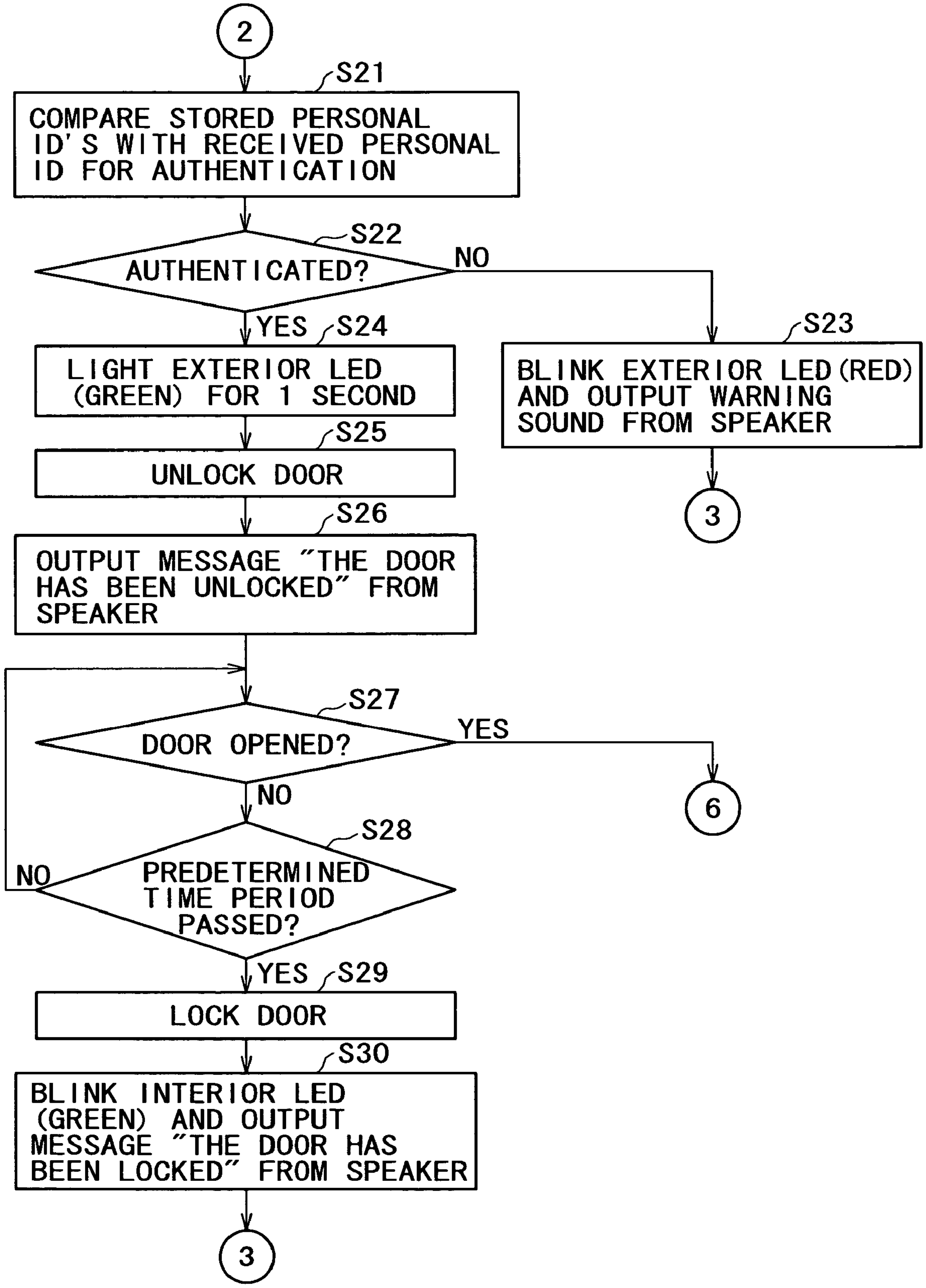
FIG. 14 is another flowchart of steps performed by the door locking unit used by the electronic device controlling system constituting the first embodiment.
Figure 15:
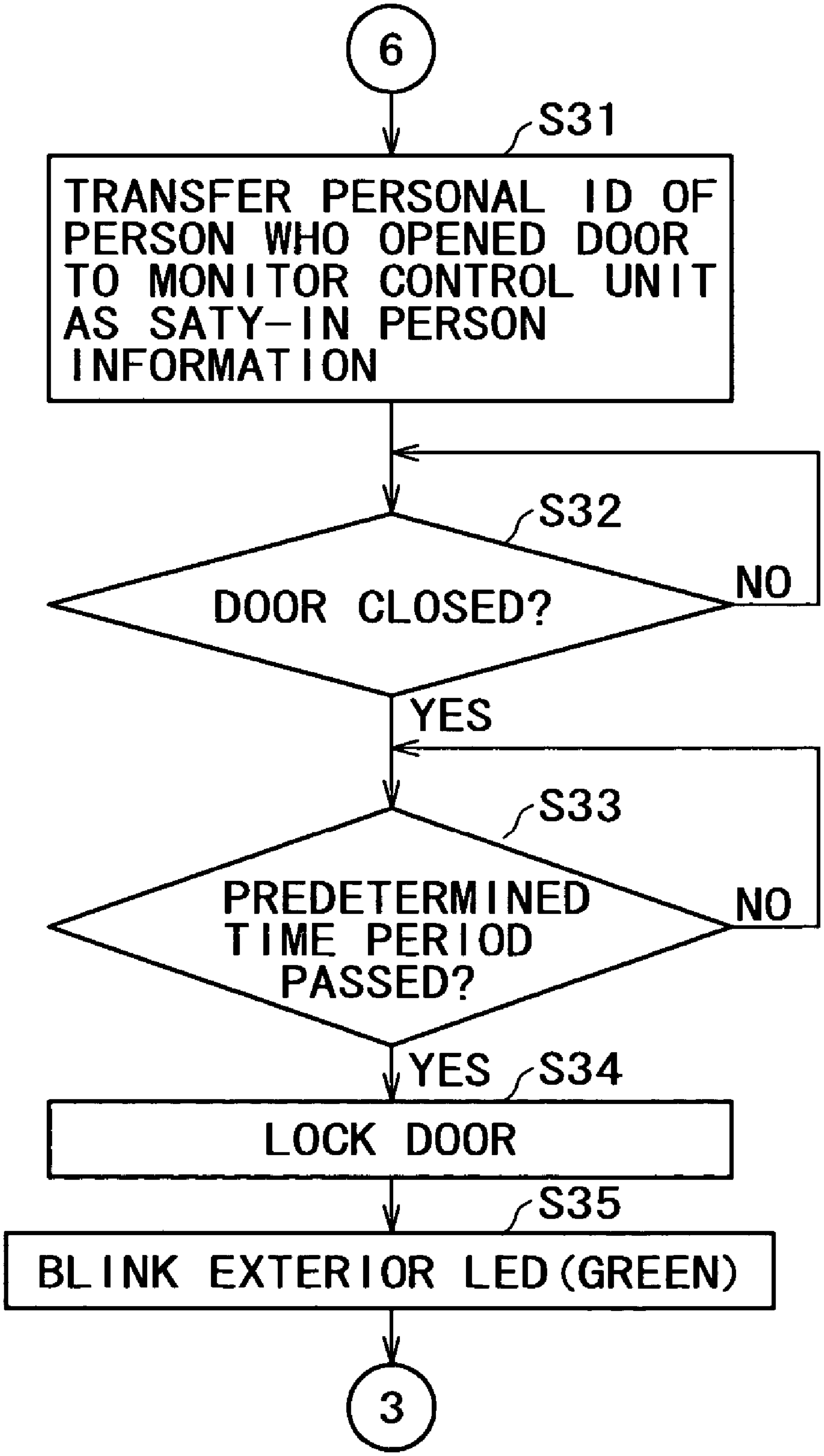
FIG. 15 is another flowchart of steps performed by the door locking unit used by the electronic device controlling system constituting the first embodiment.

[In the Case of Communication with the Exterior Read/Write Unit 21*ex*; FIGS. 14 and 15]

If in step S3 the exterior read/write unit 21*ex* is found to have communicated with the personal card 10, the CPU 201 determines that a family member is entering the house or some other stay-out person is requesting entry into the house. In that case, the CPU 201 proceeds to carry out the following process:

The CPU 201 first compares the personal IDs in the family information memory 220 with the personal ID received from the personal card 10 to see if there is a match. That is, the CPU 201 authenticates the personal card 10 in question by determining whether the card is an electronic key card registered with the door locking unit 9 (in step S21).

The CPU 201 checks to see if the authentication is successful (in step S22). If none of the personal IDs held in the family information memory 220 coincides with the personal ID retrieved from the personal card 10, the CPU 201 determines that the authentication has failed (NG). In this case, the CPU 201 causes the exterior LED drive unit 208 to blink the exterior LED 22*ex* in red and the exterior speaker 23*ex* to output a warning sound, thereby informing the user of the personal card 10 that the authentication has failed (in step S23). The door locking mechanism 28 is left in its locked state, and control is returned to step S1.

If in step S22 one of the personal IDs in the family information memory 220 matches the personal ID received from the personal card 10, the CPU 201 determines that the authentication is successful (OK). In this case, the CPU 201 causes the exterior LED drive unit 208 to light the exterior LED 22*ex* in green for one second, thereby informing the user of the personal card 10 that the card has been authenticated (in step S24). At this point, the CPU 201 may cause the exterior speaker 23*ex* to output an audible message "Your card has been authenticated".

With the authentication successfully terminated, the CPU 201 drives the door locking mechanism drive unit 212 in a manner causing the door locking mechanism 28 to unlock the front door 8 (in step S25). The CPU 201 then causes the exterior speaker 23*ex* to output an audible message "The door has been unlocked" (in step S26). At this point, the CPU 201 may cause the exterior LED 22*ex* to blink illustratively in green, informing the user of the personal card 10 that the front door has been unlocked.

The CPU 201 then admits a sensor output of the door closure sensor 27 through the interface 211, to see if the front door 8 is opened (in step S27). The CPU 201 determines whether a predetermined time period (e.g., 10 seconds) has elapsed without the front door 8 being opened (in step S28). Upon elapse of the predetermined time period (e.g., after 10 seconds), the CPU 201 automatically locks the front door 8 (in step S29). The CPU 201 causes the exterior LED 22*ex* to blink in green, indicating that the front door 8 is locked again (in step S30).

If in step S27 the front door 8 is found to be opened within 10 seconds of the unlocking in step S25, the CPU 201 determines that the stay-out person identified by the personal ID admitted in step S2 has returned home. In that case, the CPU 201 transfers to the monitor control unit 1 the personal ID in question as stay-in person information (in step S31 of FIG. 15).

The CPU 201 confirms that the front door 8 is closed by referencing the sensor output from the door closure sensor 27 (in step S32). If a predetermined time period (e.g., 3 seconds) is found to have elapsed after the front door 8 was closed (in step S33), the CPU 201 drives the door locking mechanism drive unit 212 in a manner causing the door locking mechanism 28 to lock the front door 8 (in step S34). The CPU 201 causes the interior LED 22*in* to blink in green, indicating that the front door 8 is locked again (in step S35). Control is then returned to step S1.

Figure 16:
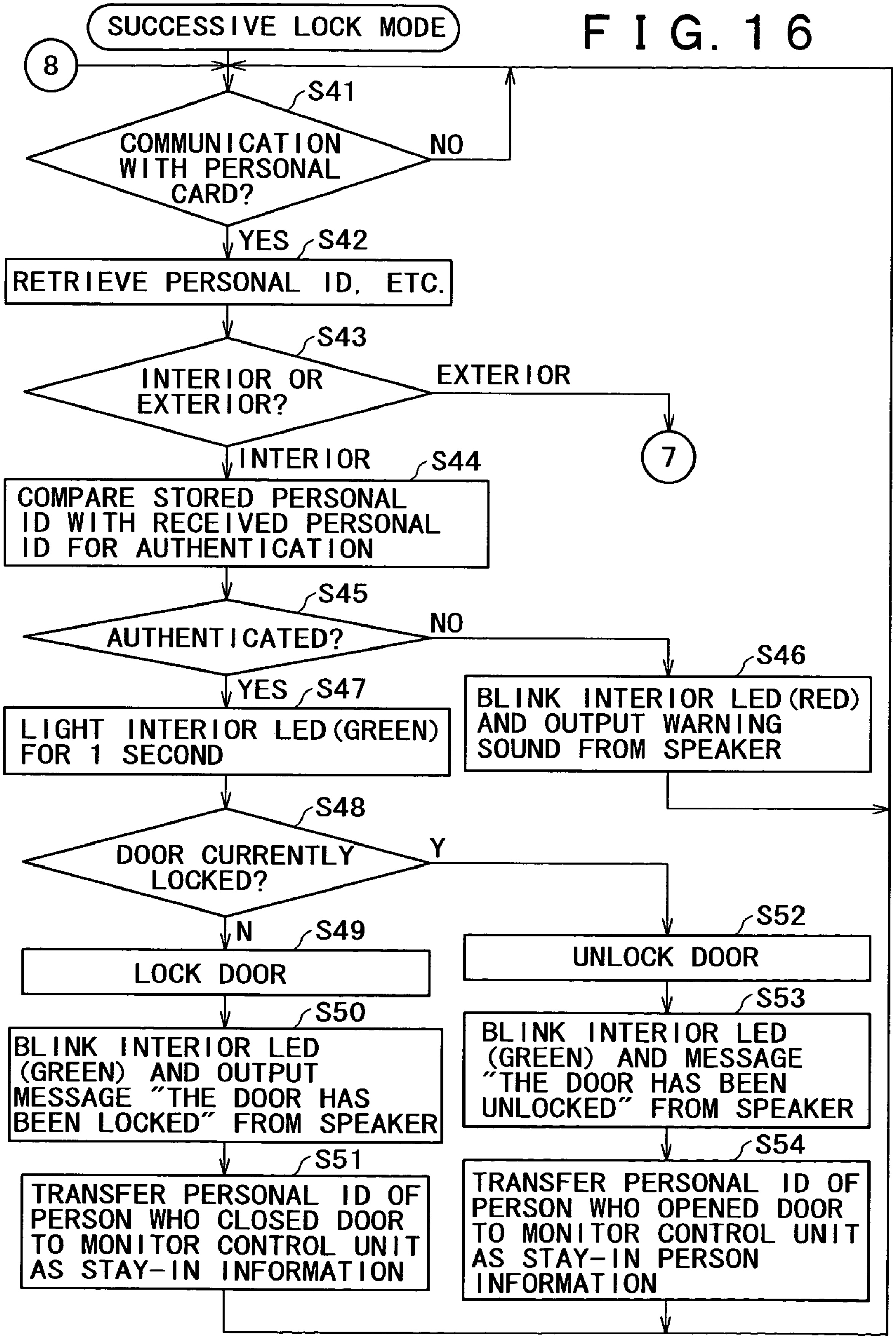
FIG. 16 is another flowchart of steps performed by the door locking unit used by the electronic device controlling system constituting the first embodiment.
Figure 17:
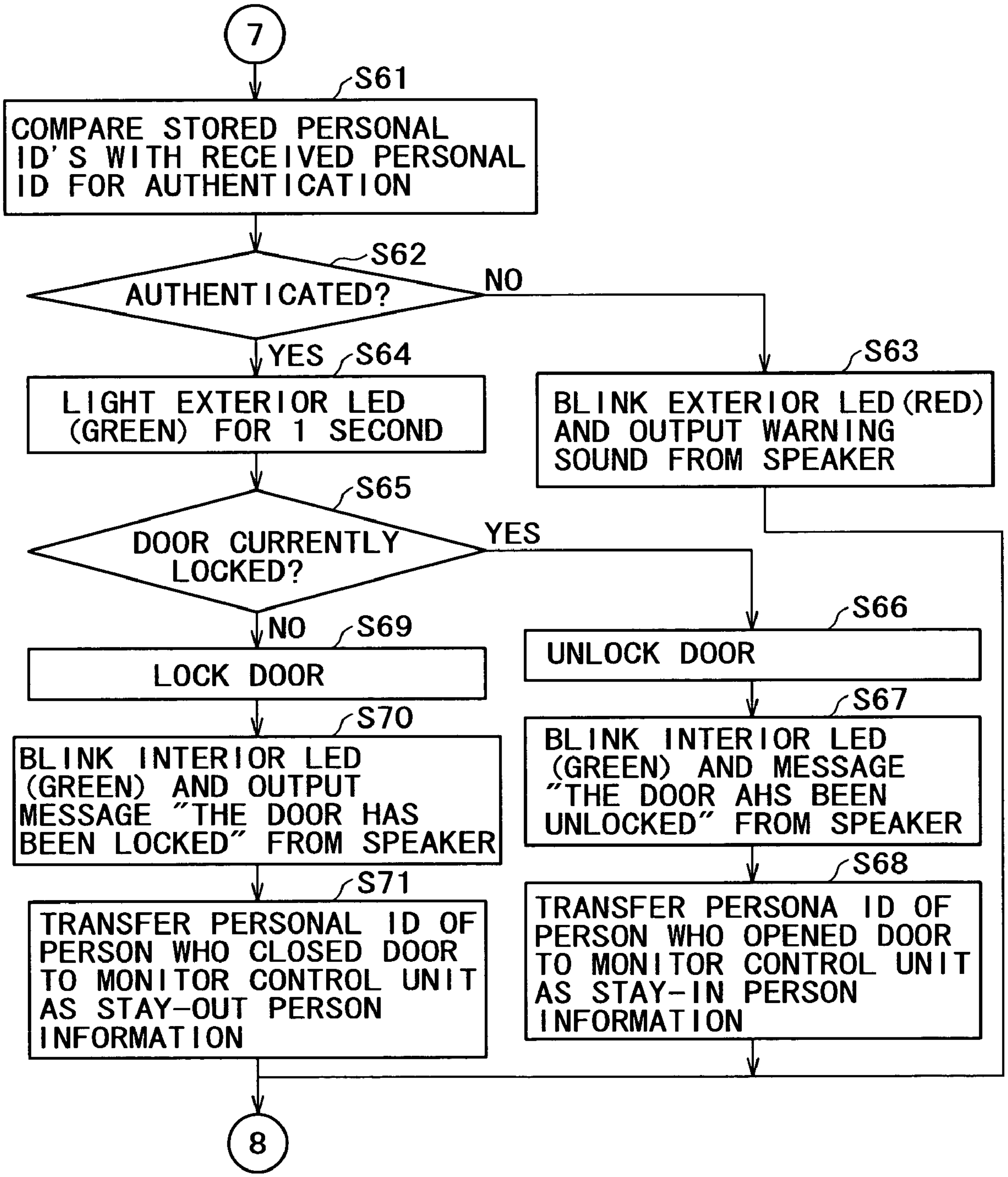
FIG. 17 is another flowchart of steps performed by the door locking unit used by the electronic device controlling system constituting the first embodiment.

[Explanation of the Successive Lock Mode; FIGS. 16 and 17]

The workings of the door locking unit 9 in the successive lock mode will now be described by referring to the flowcharts of FIGS. 16 and 17. With the successive lock mode in effect, the personal card 10 is held onto the interior read/write unit 21*in* or exterior read/write unit 21*ex* so that communication will take place between the two units. When the personal ID from the personal card 10 is authenticated, the door lock control unit 200 controls the door locking mechanism 28 in a manner causing the front door 8 to switch from the currently locked state to an unlocked state or vice versa.

The CPU 201 monitors the interior and exterior read/write units 21*in* and 21*ex* through the interfaces 205 and 206 respectively, and waits for a personal card 10 to be held onto the interior or exterior read/write unit 21*in* or 21*ex* so that communications will take place therebetween (in step S41).

If in step S41 the personal card 10 is held onto the read/write unit with communications effected therebetween, the CPU 201 receives personal information including a personal ID from the personal card 10 and temporarily stores the retrieved information into, say, the RAM 204 (in step S42). At this point, the personal card 10 is fed with time information in the manner described above, the information being written to a memory inside. The time information and other related information are also written to the family information memory 220 of the door lock control unit 200 and to the family information memory 105 of the monitor control unit 1.

The CPU 201 determines which of the interior and exterior read/write units 21*in* and 21*ex* has communicated with the personal card 10 (in step S43).

[In the Case of Communication with the Interior Read/Write Unit 21*in*; FIG. 16]

If in step S43 the interior read/write unit 21*in* is found to have communicated with the personal card 10, the CPU 201 determines that a stay-in person with the card is about to lock the front door 8 for leaving the house or for security reasons. In that case, the CPU 201 proceeds to carry out the following process:

The CPU 201 first compares the personal IDs in the family information memory 220 with the personal ID received from the personal card 10 to see if there is a match. That is, the CPU 201 authenticates the personal card 10 in question by determining whether the card has already been registered with the door locking unit 9 (in step S44).

The CPU 201 checks to see if the authentication is successful (in step S45). If none of the personal IDs held in the family information memory 220 coincides with the personal ID retrieved from the personal card 10, the CPU 201 determines that the authentication has failed (NG). In this case, the CPU 201 causes the interior LED drive unit 207 to blink the interior LED 22*in* in red and the interior speaker 23*in* to output a warning sound, thereby informing the user of the personal card 10 that the authentication has failed (in step S46). The door locking mechanism 28 is left in its locked state, and control is returned to step S41.

If in step S45 one of the personal IDs in the family information memory 220 matches the personal ID received from the personal card 10, the CPU 201 determines that the authentication is successful (OK). In this case, the CPU 201 causes the interior LED drive unit 207 to light the interior LED 22*in* in green for one second, thereby informing the user of the personal card 10 that the card has been authenticated (in step S47). At this point, the CPU 201 may cause the interior speaker 23*in* to output an audible message "Your card has been authenticated".

The CPU 201 determines whether the front door 8 is currently locked by the door locking mechanism 28 (in step S48). If in step S48 the front door 8 is found unlocked by the door locking mechanism 28, the CPU 201 drives the door locking mechanism drive unit 212 in a manner causing the door locking mechanism 28 to lock the front door 8 again (in step S49).

The CPU 201 causes the interior LED 22*in* to blink illustratively in green and the interior speaker 23*in* to output a message "The front door has been locked," thereby informing the user of the personal card 10 that the front door 8 is locked (in step S50).

The CPU 201 recognizes that the person identified by the personal ID retrieved in step S42 has locked the door for security reasons, and transfers the personal information including the personal ID to the monitor control unit 1 as stay-in person information (in step S51).

If in step S48 the front door 8 is found currently locked by the door locking mechanism 28, the CPU 201 drives the door locking mechanism drive unit 212 in a manner causing the door locking mechanism 28 to unlock the front door 8 (in step S52). The CPU 201 causes the interior LED 22*in* to blink illustratively in green and the interior speaker 23*in* to output a message "The front door has been unlocked" (in step S53).

At this point, the CPU 201 recognizes that the person identified by the personal ID read in step S42 has unlocked the door and left the house, and transfers the personal information including the personal ID to the monitor control unit 1 as stay-out person information (in step S54).

[In the Case of Communication with the Exterior Read/Write Unit 21*ex*; FIG. 17]

If in step S43 the exterior read/write unit 21*ex* is found to have communicated with the personal card 10, the CPU 201 determines that a family member coming home is about to unlock the front door 8 or a family member leaving the house is locking the front door 8. In that case, the CPU 201 proceeds to carry out the following process:

The CPU 201 first compares the personal IDs in the family information memory 220 with the personal ID received from the personal card 10 to see if there is a match. That is, the CPU 201 authenticates the personal card 10 in question by determining whether the card has already been registered with the door locking unit 9 (in step S61).

The CPU 201 checks to see if the authentication is successful (in step S62). If none of the personal IDs held in the family information memory 220 coincides with the personal ID retrieved from the personal card 10, the CPU 201 determines that the authentication has failed (NG). In this case, the CPU 201 causes the exterior LED drive unit 208 to blink the exterior LED 22*ex* in red and the exterior speaker 23*ex* to output a warning sound, thereby informing the user of the personal card 10 that the authentication has failed (in step S63). The door locking mechanism 28 is left in its locked state, and control is returned to step S41.

If in step S62 one of the personal IDs in the family information memory 220 matches the personal ID received from the personal card 10, the CPU 201 determines that the authentication is successful (OK). In this case, the CPU 201 causes the exterior LED drive unit 208 to light the exterior LED 22*ex* in green for one second, thereby informing the user of the personal card 10 that the card has been authenticated (in step S64). At this point, the CPU 201 may cause the exterior speaker 23*ex* to output an audible message "Your card has been authenticated".

The CPU 201 determines whether the front door 8 is currently locked by the door locking mechanism 28 (in step S65). If in step S65 the front door 8 is found currently locked by the door locking mechanism 28, the CPU 201 drives the door locking mechanism drive unit 212 in a manner causing the door locking mechanism 28 to unlock the front door 8 (in step S66). The CPU 201 causes the exterior LED 22*ex* to blink illustratively in green and the exterior speaker 23*ex* to output a message "The front door has been unlocked" (in step S67).

At this point, the CPU 201 recognizes that the person identified by the personal ID read in step S42 has unlocked the door to enter the house, and transfers the personal information including the personal ID to the monitor control unit 1 as stay-in person information (in step S68).

If in step S65 the front door 8 is found unlocked by the door locking mechanism 28, the CPU 201 drives the door locking mechanism drive unit 212 in a manner causing the door locking mechanism 28 to lock the front door 8 again (in step S69).

The CPU 201 causes the exterior LED 22*ex* to blink illustratively in green and the exterior speaker 23*ex* to output a message "The front door has been locked", thereby informing the user of the personal card 10 that the front door 8 is locked (in step S70).

The CPU 201 recognizes that the person identified by the personal ID retrieved in step S42 has locked the door to leave the house, and transfers the personal information including the personal ID to the monitor control unit 1 as stay-out person information (in step S71). Control is then returned to step S41.

[Operation of the ID Transmitter-Receiver Unit]

Figure 18:
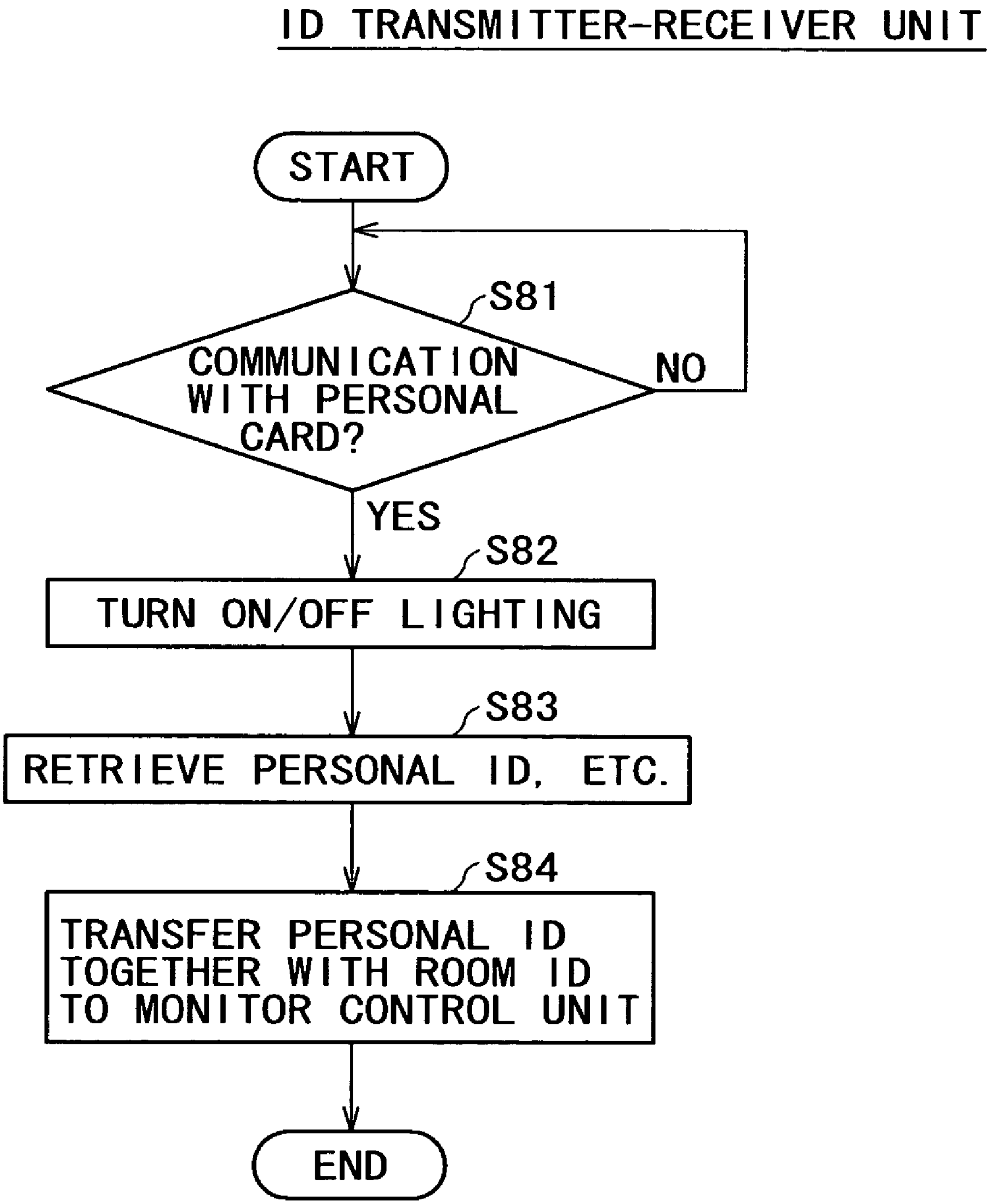
FIG. 18 is a flowchart of steps performed by the ID transmitter-receiver unit used by the electronic device controlling system constituting the first embodiment.

Described below with reference to the flowchart of FIG. 18 is how the ID transmitter-receiver units 7A through 7D installed in the rooms A through D illustratively operate each.

The CPU 701 monitors the read/write unit 72 through the interface 709, and waits for a personal card 10 to be held onto the read/write unit 72 so that communications will take place therebetween (in step S81).

If in step S81 the personal card 10 is held onto the read/write unit with communications effected therebetween, the CPU 701 causes the lighting control unit 706 to switch the lighting from the current turned-off state to a turned-on state or vice versa (in step S82).

The CPU 701 receives personal information including a personal ID from the personal card 10, and writes the retrieved information temporarily to, say, the RAM 704 together with time information provided by the clock circuit 705 (in step S83). The time information from the clock circuit 705 is also fed to the personal card 10 and written to a memory of the control IC 12 inside.

The CPU 701 then transfers to the monitor control unit 1 the personal ID acquired in step S83 along with identification information from the ID transmitter-receiver unit in question. The identification information from the ID transmitter-receiver unit in this case is equivalent to a room ID, i.e., it indicates the room in which the ID transmitter-receiver unit is installed. Given the personal ID along with the room ID, the monitor control unit 1 comes to know who has entered or left the room.

In this example, the monitor control unit 1 is connected to the ID transmitter-receiver units 7A, 7B, 7C and 7D via a LAN. This setup requires that a personal ID along with the room ID be sent from each of the ID transmitter-receiver units 7A through 7D in operation to the monitor control unit 1. Alternatively, if each of the ID transmitter-receiver units 7A through 7D is connected to the monitor control unit 1 via a different communication interface, the room ID may be omitted provided that each of the interfaces involved is predetermined to be connected to the ID transmitter-receiver unit of each specific room.

Figure 19:
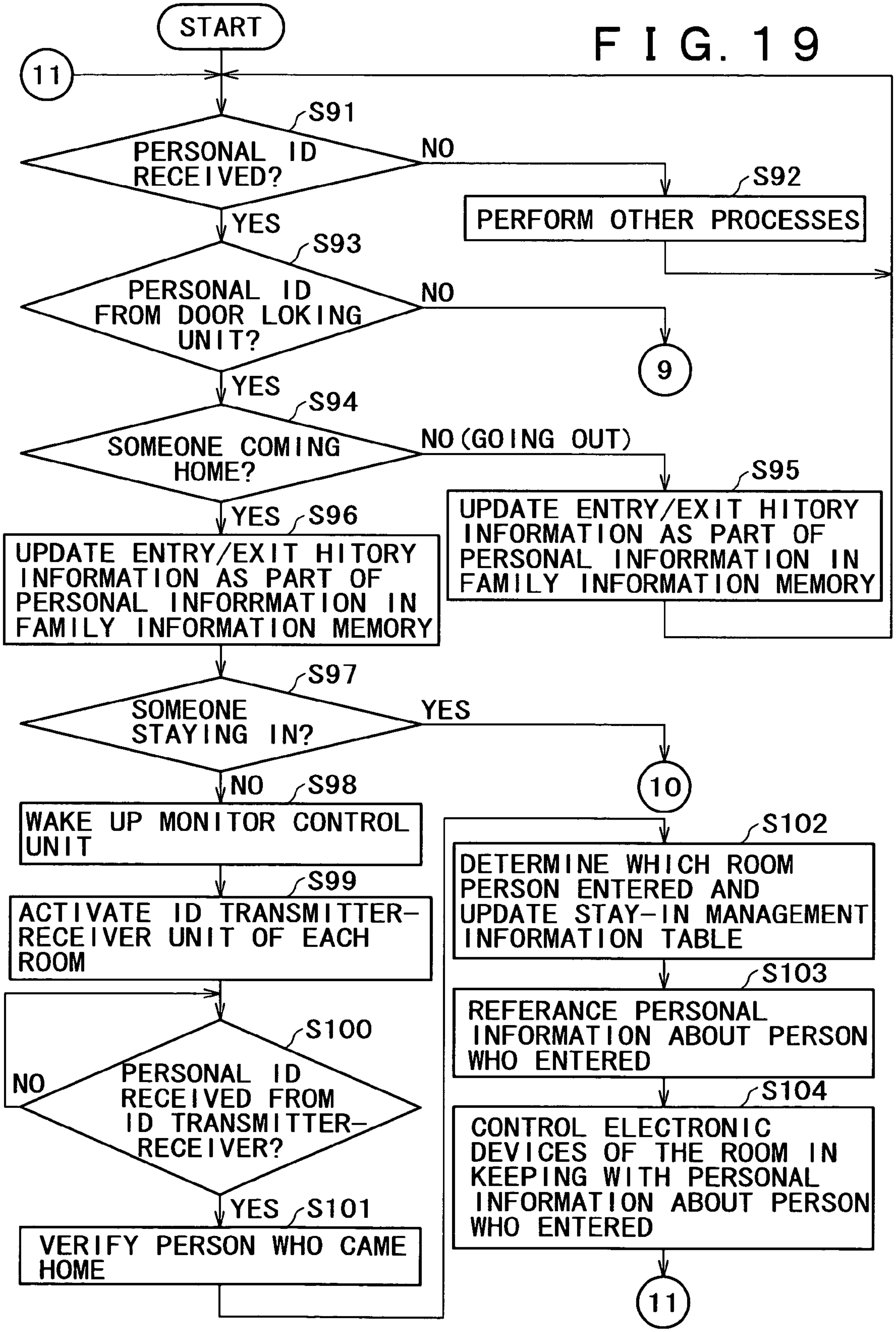
FIG. 19 is a flowchart of steps performed by the monitor control unit used by the electronic device controlling system constituting the first embodiment.
Figure 20:
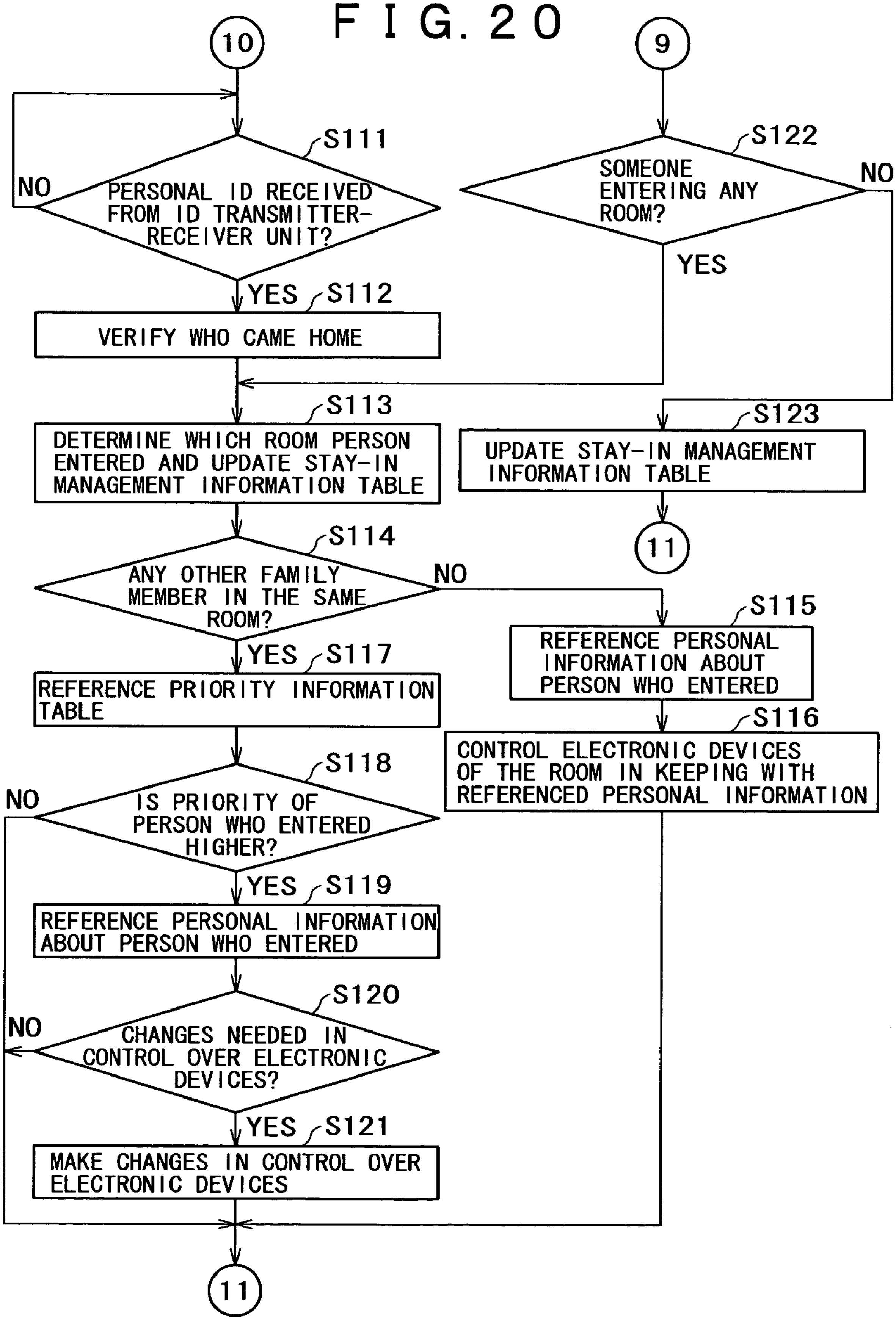
FIG. 20 is another flowchart of steps performed by the monitor control unit used by the electronic device controlling system constituting the first embodiment.

[Explanation of the Operation of the Monitor Control Unit 1; FIGS. 19 and 20]

What follows is a description of the workings of the monitor control unit 1 as it acquires a personal ID from the door locking unit 9 or from any one of the ID transmitter-receiver units 7A through 7D having communicated with the personal card 10. The description below will be made with reference to the flowcharts of FIGS. 19 and 20.

The CPU 101 first determines whether or not a personal ID has been received (in step S91). If no personal ID is received, the CPU 101 proceeds with other processes, and after the processes, returns to step S91.

If in step S91 a personal ID is found received, the CPU 101 checks to see whether or not the personal ID has been sent from the door locking unit 9 (in step S93). If in step S93 the personal ID is found to have come from the door locking unit 9, the CPU 101 determines whether or not the personal ID belongs to a person having come home (in step S94).

If in step S94 the personal ID is found to belong to someone leaving the house, then the CPU 101 updates the entry/exit history information within that personal profile information in the family information memory 105 which contains the personal ID identical to the received personal ID. Specifically, the time of day at which the personal ID was received and information identifying the person leaving the house are written as updates to the entry/exit history information in question (in step S95). Control is then returned to step S91.

If in step S94 the personal ID is found to belong to someone coming home, the CPU 101 updates the entry/exit history information within that personal profile information in the family information memory 105 which contains the personal ID identical to the received personal ID. Specifically, the time of day at which the personal ID was received and information identifying the person entering the house are written as updates to the entry/exit history information in question (in step S96).

The CPU 101 then determines whether there is anyone currently staying at home by referencing the stay-in management information table in the family information memory 105 (in step S97). If no one is found to stay in, the CPU 101 puts the monitor control unit 1 in an active state (in step S98). That is, when all family members have gone out of the house, only the interface 106 has been left active to receive information from the CPU 101, ROM 103, RAM 104 and door locking unit 9, with all other components placed in a standby state in order to minimize power dissipation. When someone is found to have returned home, the monitor control unit 1 is "woken up" from its standby state and brought into the active state.

The monitor control unit 1 then places the ID transmitter-receiver units 7A, 7B, 7C and 7D of the respective rooms into the active state (in step S99). That is, with no one staying in the house, the ID transmitter-receiver units 7A, 7B, 7C and 7D were not needed and were placed in the standby state to reduce power consumption. When someone coming home is the first to enter the house, these ID transmitter-receiver units 7A, 7B, 7C and 7D are again activated. The monitor control unit 1 waits for the personal ID to be sent from one of the ID transmitter-receiver units 7A, 7B, 7C and 7D (in step S100). At this point, the personal ID is sent together with the identification information about the ID transmitter-receiver unit (i.e., room ID), as mentioned above.

When the personal ID is found received from one of the ID transmitter-receiver units 7A, 7B, 7C and 7D in step S100, the CPU 101 recognizes that the person has entered one of the rooms and verifies the person's identity (in step S101). The CPU 101 determines the room that the person has entered, and updates the stay-in management information table in the family information memory 105, according to the room ID transferred with the personal ID (in step S102). Specifically, information about who entered which room is written to the stay-in management information table as updates.

At this point, if the information sent from the ID transmitter-receiver unit contains time information, that time information is used to determine the time of day at which the person entered the room. The time of day thus determined is written to the stay-in management information table and is also stored as part of historical information. If the information from the ID transmitter-receiver unit includes no time information, the CPU 101 can tap time information from the clock circuit 107 when finding out the time of day at which the personal ID or other information was received from the ID transmitter-receiver unit. The time information thus acquired may be used as room entry time information.

The CPU 101 then searches the family information memory 105 for the personal information about the person who entered the room (in step S103). On the basis of taste/preference information within the personal information, the CPU 101 generates control signals to control accordingly the electronic devices in the room that the person entered, and transmits the control signals to the electronic devices (in step S104).

Illustratively, if a reference to the personal information about the person who entered the room reveals that this person prefers TV dramas and if a drama is being broadcast currently on a TV channel, then the monitor control unit 1 turns on the TV set among the electronic devices in the room, generates a control signal to select the TV channel in question, and feeds the generated control signal to the TV set.

If the reference to the personal information about the person who entered the room reveals that the person prefers classical music on the radio and if a classical music program is being aired currently on an FM radio station, then the monitor control unit 1 turns on the audio set among the electronic devices in the room, generates a control signal to select the FM radio station broadcasting the classical music program, and supplies the generated control signal to the audio set in the room.

Likewise, if the reference to the taste/preference information about the person who entered the room reveals that this person's hobby is golf and if a golf tournament program is being broadcast currently on an TV channel, then the monitor control unit 1 turns on the TV set among the electronic devices in the room, generates a control signal to select the TV channel broadcasting the program, and sends the generated control signal to the TV set in the room.

The programs being broadcast at any given point in time can be known from broadcast program information such as EPG (electronic programming guide) placed beforehand in, say, the RAM 104 of the monitor control unit 1. Referring to such broadcast program information reveals what programs are being broadcast on which channels or by which stations at a given point in time.

When the control operations on the electronic devices are finished in step S104, control is returned to step S91. The CPU 101 then waits for a personal ID to be received.

If in step S97 someone is found to stay in the house, that means the monitor control unit 1 and the ID transmitter-receiver units 7A through 7D are all being active already. In that case, the CPU 101 waits for a personal ID to be sent from one of the ID transmitter-receiver units 7A, 7B, 7C and 7D (in step Sill).

When the CPU 101 detects the personal ID coming from one of the ID transmitter-receiver units 7A, 7B, 7C and 7D in step S111, the CPU 101 recognizes that the person who came home entered one of the rooms and identifies that person (in step S112). Based on the room ID received along with the personal ID, the CPU 101 determines which of the rooms A through D the person entered, and records who entered which room to the stay-in management information table in the family information memory 105 (in step S113). At this point, as mentioned earlier, the room entry time information is also written to the stay-in management information table and is also stored as part of the historical information.

The CPU 101 determines whether the room the person having come home just entered has someone staying inside already, by referencing the stay-in management information table (in step S114). If in step S114 no other family member is found staying in the room, the CPU 101 searches the family information memory 105 for the personal information about the person who entered the room (in step S115). As in the process discussed above in connection with step S104, on the basis of the taste/preference information in the personal information, the CPU 101 generates control signals to control accordingly the electronic devices in the room that the person entered, and transmits the control signals to the electronic devices (in step S116).

If in step S114 some other family member is found staying in the room, the CPU 101 references the priority information table in the family information memory 105 (in step S117). In so doing, the CPU 101 determines whether the priority of the person having entered the room is higher than that of the family member already in the room (in step S118).

If in step S118 the priority of the person having entered the room is not found higher than that of the person already staying in the room, the CPU 101 maintains the current status of the electronic devices (i.e., no control changes effected). Control is then returned to step S91.

If in step S118 the priority of the person having entered the room is found higher than that of the person already in the room, the CPU 101 searches for and refers to the personal information about the person having entered the room, the search being made through the family information memory 105 (in step S119). On the basis of the personal information about the person having entered the room, the CPU 101 determines the controlled status of the electronic devices in the room as described above, and checks to see if it is necessary to make control changes to the electronic devices in question (in step S120).

If in step S120 the CPU 101 determines that there is no need to make control changes to the electronic devices, control is returned to step S91. If in step S120 the CPU 101 finds it necessary to make control changes to the electronic devices, then the CPU 101 controls the device in accordance with the personal information about the person having entered the room as in the process of step S104 or S116 discussed above, so that the status preferred by the person having the high priority may be attained (in step S121). Control is then returned to step S91.

Suppose that in step S121, the child who had come home earlier is in the room A watching a favorite TV program, when the father having just returned enters the same room. In that case, the TV set is illustratively switched from the ongoing program preferred by the child to the father's favorite program so as to reflect the preferences of the father whose priority is higher than the child's.

If in step S93 the received personal ID is found to come not from the door locking unit 1 but from one of the ID transmitter-receiver units 7A, 7B, 7C and 7D, the CPU 101 references the stay-in management information table to determine whether the person identified by the personal ID is entering or leaving the room indicated by the room ID sent together with the personal ID (in step S122).

If in step S122 the reference to the stay-in management information table reveals that the person identified by the personal ID is in the room indicated by the room ID sent along with the personal ID, that person is deemed leaving the room; if the reference to the stay-in management information table shows that the person identified by the personal ID is out of the room indicated by the room ID, that person is deemed entering the room.

If in step S122 the person identified by the personal ID is deemed leaving the room indicated by the room ID, the CPU 101 updates the stay-in management information table by deleting from it information about the person with the personal ID staying in the room indicated by the room ID (in step S123). Control is then returned to step S91.

If in step S122 the person identified by the personal ID is deemed entering the room indicated by the room ID, then step S113 is reached. In step S113, the CPU 101 recognizes the room that the person identified by the personal ID has entered, and updates the stay-in management information table by adding to it information about that person staying in the room indicated by the room ID. If the personal ID is found recorded as indicative of a person staying in some other room, the CPU 101 updates the stay-in management information table by deleting from it information about that person staying in the other room, and carries out the steps subsequent to step S113.

According to the first embodiment of this invention, as described, the monitor control unit 1 controls the electronic devices in the room that a person coming home has just entered, in a manner reflecting the person's preferences. That means there is no need for anyone entering a room to manipulate a remote controller to control the electronic devices in that room as desired; the controls are effected in conveniently automated fashion.

If a family member is already staying in a room that another family member has just entered, the priorities of the persons are compared and the electronic devices in that room are controlled in accordance with the preferences of the person who has the higher priority. The automated switchover or the maintenance of status of the electronic devices by the embodiment of the invention helps promote better communication between the family members.

[Second Embodiment]

The first embodiment of the invention discussed above has the ID transmitter-receiver units 7A through 7D installed in the rooms and connected to the monitor control unit 1. Each of the ID transmitter-receiver units 7A through 7D reads a personal ID and other necessary information from the personal card 10 held onto the unit, and sends the retrieved information to the monitor control unit 1 so that each person entering or leaving any one of the rooms may be detected and registered accordingly. Alternatively, a home network system may be set up without recourse to the ID transmitter-receiver units installed in the rooms.

The second embodiment of the invention to be described below utilizes illustratively a remote controller for the electronic devices (such as TV set, etc.) in each room as a personal identification information transmitting element replacing the ID transmitter-receiver unit.

Figure 21:
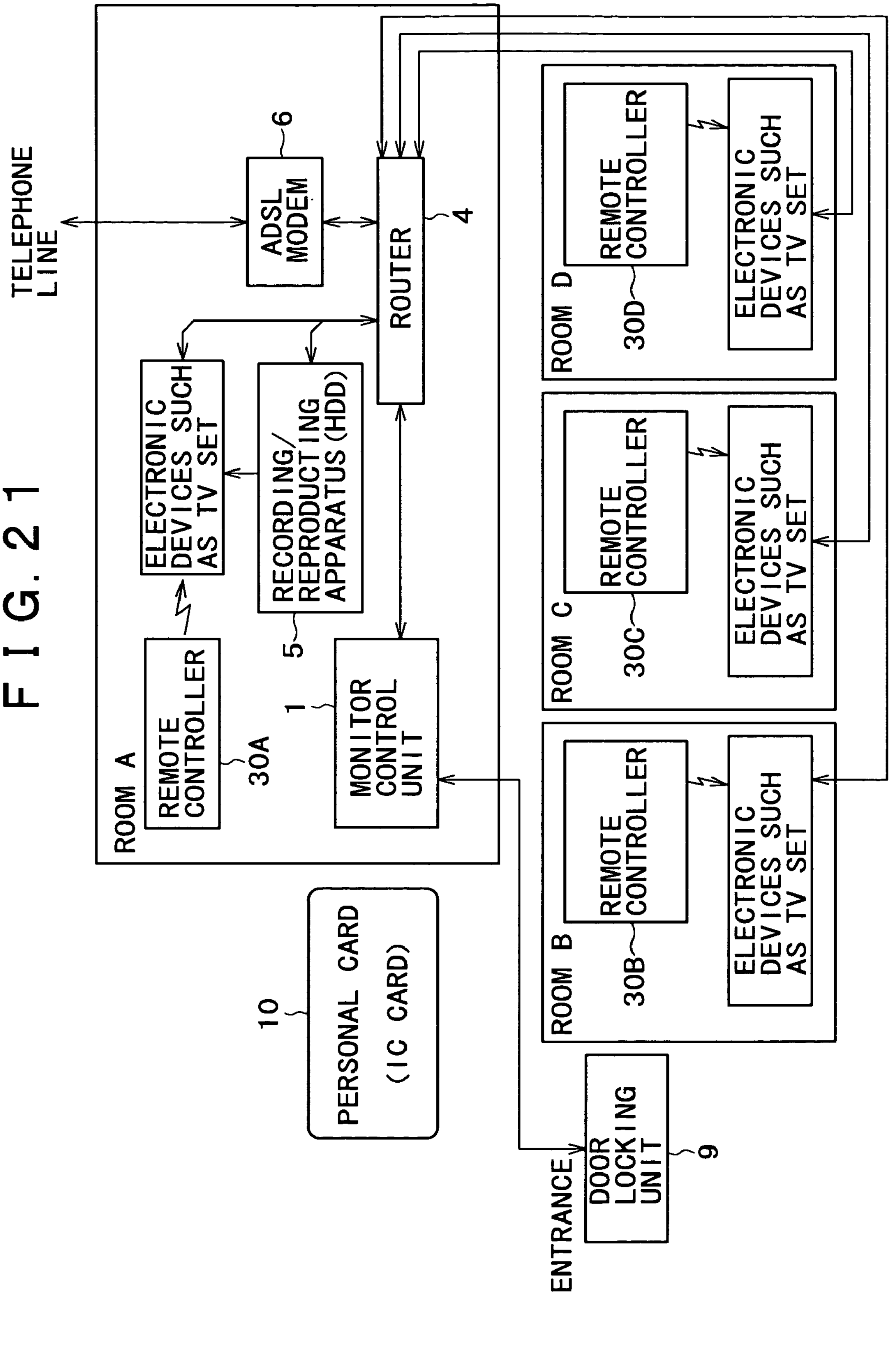
FIG. 21 is a schematic block diagram of an electronic device controlling system practiced as a second embodiment of the invention.

FIG. 21 schematically shows a typical configuration of a home network system practiced as the second embodiment of the invention. In FIG. 21 showing the home network system as the second embodiment, the components having their functionally equivalent counterparts in the first embodiment described earlier are designated by like reference numerals, and their detailed descriptions will be omitted hereunder where redundant.

As shown in FIG. 21, the second embodiment serving as the home network system includes a monitor control unit 1, electronic devices such as a TV set 2A, a router 4, a hard disc drive 5, and an ADSL modem 6 in a room A. Other rooms B, C and D are furnished with electronic devices such as TV sets 2B, 2C and 2D and audio sets 3A and 3C.

As with the first embodiment, the monitor control unit 1 set up in the room A is connected via the router 4 to the electronic devices installed in the rooms A, B, C and D. The connection allows the monitor control unit 1 to feed control data to the electronic devices in the rooms for control purposes. Content data such as video data and audio data can be exchanged between the electronic devices in the respective rooms as well as between the hard disc drive 5 on the one hand and these electronic devices on the other hand.

In this setup, the monitor control unit 1 intervenes as a mediator controlling the exchanges of content data such as video and audio data between the hard disc drive on the one hand and a plurality of electronic devices on the other hand.

The home network system of the second embodiment in FIG. 21 has no ID transmitter-receiver units in the rooms A, B, C and D. Instead, the rooms A through D are equipped respectively with remote controllers 30A, 30B, 30C and 30D for remote control over the electronic devices. Each of the remote controllers 30A through 30D has a hybrid structure capable of controlling a plurality of electronic devices. Illustratively, the remote controllers 30A through 30D each have key buttons for remotely controlling the lighting fixtures, the TV set, and audio set in each of the rooms.

With the second embodiment, the remote controllers 30A, 30B, 30C and 30D each have a loading unit for accommodating a personal card 10. Only when the personal card 10 is loaded into a remote controller can that remote controller become operable.

[Typical Structure of the Remote Controller]

Figure 22:
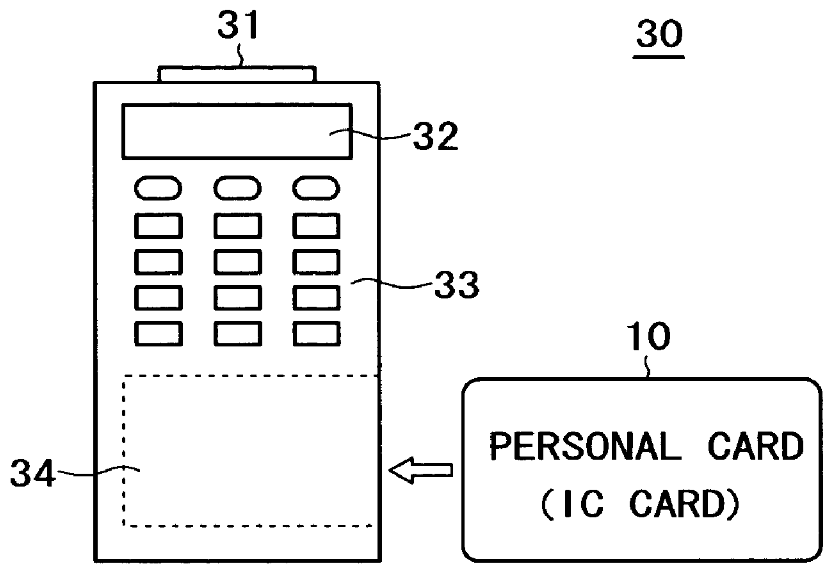
FIG. 22 is a schematic view showing a typical structure of a remote controller used by the electronic device controlling system constituting the second embodiment.
Figure 23:
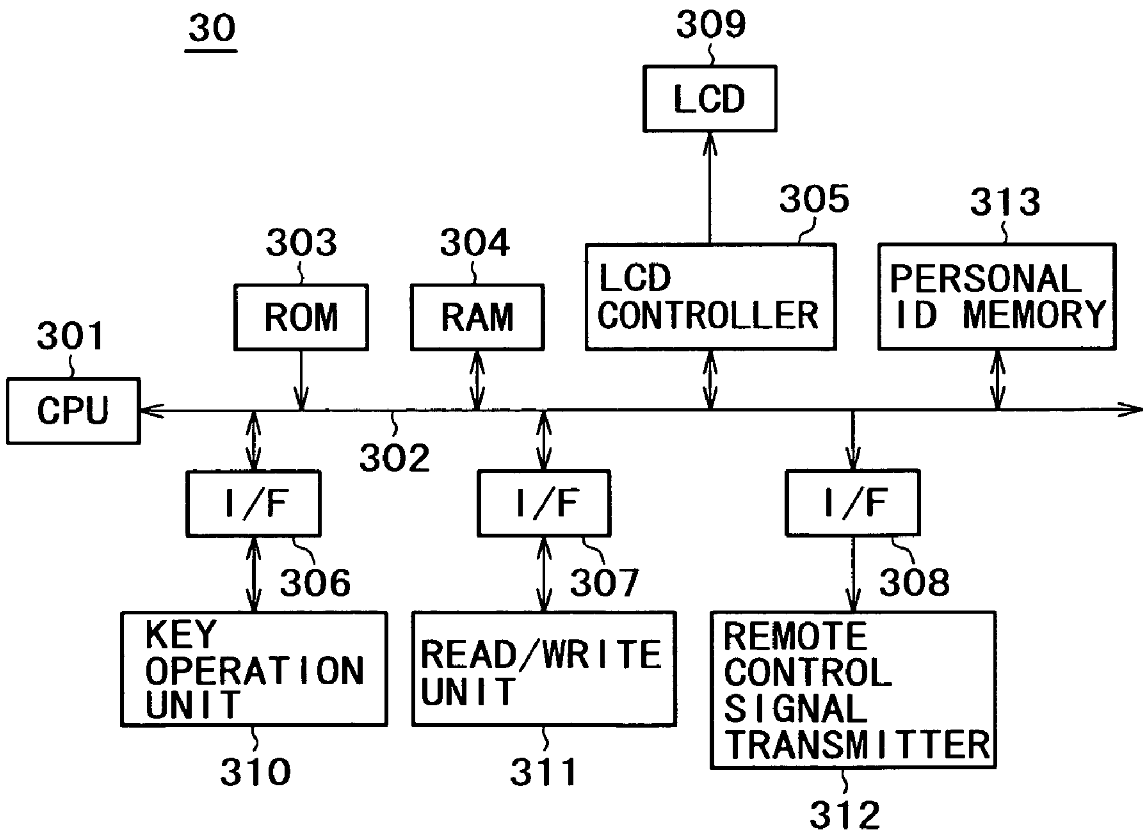
FIG. 23 is a schematic block diagram of the remote controller used by the electronic device controlling system constituting the second embodiment.

FIGS. 22 and 23 show a typical structure of one of the remote controllers 30A, 30B, 30C and 30D installed in the rooms. Since the remote controllers 30A through 30D are structurally identical, FIGS. 22 and 23 and the descriptions associated therewith deal with a single, generic remote controller 30 representative of all the remote controllers involved.

FIG. 22 schematically shows an external view of the remote controller 30. As illustrated, the remote controller 30 includes a remote control signal transmission unit 31, an LCD 32, a group of operation keys 33, and a card loading unit 34. The remote control signal transmission unit 31 generates remote control signals using illustratively infrared rays. The LCD 32 displays diverse kinds of information on it screen. The operation keys 33 such as numerical keys and function keys are operated by the user entering instructions into the remote controller 30. The card loading unit 34 accommodates the personal card 10 inserted into its slot.

The card loading unit 34 incorporates a read/write unit which communicates with the loaded personal card 10 and which writes and reads data to and from a control IC inside that personal card 10.

FIG. 23 is a block diagram schematically indicating an electrical structure of the remote controller 30. As shown in FIG. 23, the remote controller 30 has a microcomputer-based structure in which a CPU 301 is connected via a system bus 302 to a ROM 303, a RAM 304, an LCD controller 305, interfaces 306, 307 and 308, and a personal ID memory 313.

The LCD controller 305 is connected to the LCD 32. The CPU 301 controls the LCD controller 305 in a manner causing the LCD 32 to display operation status, guidance messages, and other information on its screen.

The interface 306 is connected to a key operation unit 310, the interface 307 to a read/write unit 311, and the interface 308 to a remote control signal transmitter 312.

An operation instruction entered by the user through the key operation unit 310 is fed to the CPU 301 through the interface 306. Given the instruction from the user through the key operation unit 310, the CPU 301 controls the remote control signal transmitter 312 by way of the interface 308. Specifically, an infrared remote control signal reflecting the user's input operation is transmitted from the remote control signal transmitter 312.

The personal ID memory 313 retains a personal ID of the person who uses this remote controller 30. The personal ID in the personal ID memory 313 is used to determine whether the personal card loaded into the remote controller 30 belongs to the person whose personal ID is held in the memory 313.

Figure 24:
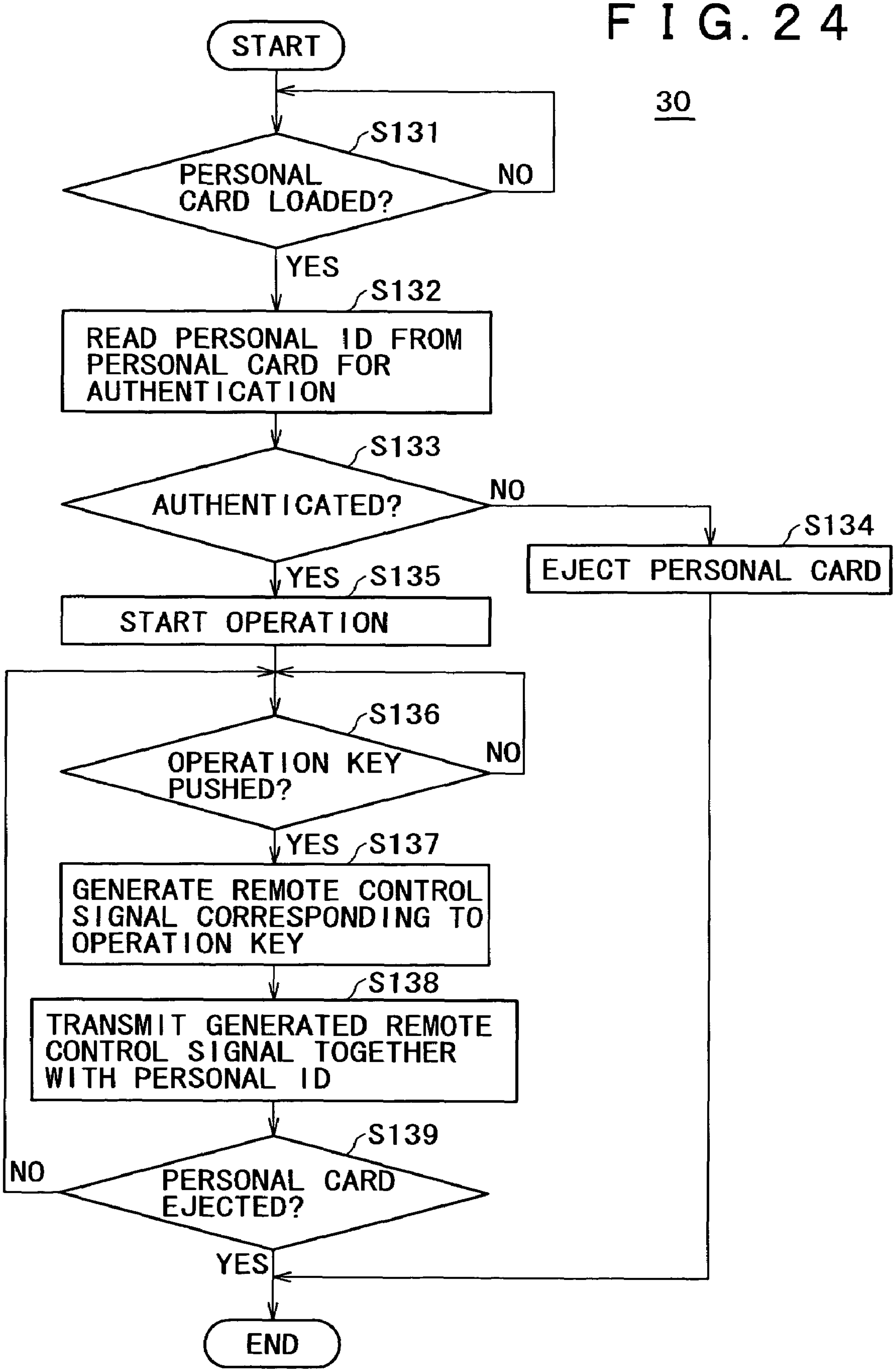
FIG. 24 is a flowchart of steps performed by the remote controller used by the electronic device controlling system constituting the second embodiment.

FIG. 24 is a flowchart of steps performed by the remote controller 30 used in the second embodiment of the invention. The CPU 301 first determines whether a personal card 10 is loaded (in step S131). If a personal card 10 is found loaded, the CPU 301 reads the personal ID from the loaded personal card 10 through the read/write unit 311. The CPU 301 places the retrieved personal ID into the RAM 304, and compares the retrieved ID with the personal ID stored in the personal ID memory 313 for authentication, i.e., to see whether the personal card 10 currently loaded in the remote controller 30 is owned by the person whose personal ID has matched the stored ID (in step S132).

If the authentication (in step S133) is found to have failed (NG), the CPU 301 forcibly ejects the personal card 10 (in step S134) and terminates the routine of FIG. 24. If the authentication is found to be successful (OK), the CPU 301 puts the remote controller 30 into an active state in which key operations by the user are accepted (in step S135).

The CPU 301 then waits for any operation key to be pushed (in step S136). When an operation key is found to be pushed, the CPU 301 generates a remote control signal corresponding to the pushed operation key (in step S137). The remote control signal thus generated is sent from the remote control signal transmitter 312 to the electronic devices together with the personal ID held in the RAM 304 (in step S138).

The CPU 301 then determines whether or not the personal card 10 is ejected by the user's ejecting action from the personal card loading unit 34 of the remote controller 30 (in step S139). If the personal card 10 is found staying loaded, step S136 is reached again and the CPU 301 waits for another operation key to be pushed. If the personal card 10 is found ejected from the remote controller 30, this processing routine is brought to an end.

In the foregoing description, authentication of the personal ID was shown executed by the remote controller 30 itself. Alternatively the authentication may be performed as follows: any key operation made immediately after loading of a personal card into the remote controller 30 is regarded as an authentication requesting operation. The requesting operation prompts the remote controller 30 to transmit an authentication request signal to the electronic devices along with the personal ID from the personal card. In turn, the electronic devices transfer the authentication request signal, together with the personal ID and supplemented at this point with device IDs of the electronic devices involved, to the monitor control unit 1 wherein the authentication is executed.

In the alternative case above, if the authentication is deemed to have failed (NG), then the monitor control unit 1 sends a control signal for canceling the received remote control signal to all electronic devices identified by the device IDs attached to the authentication request signal. The control signal effectively disables all remote control operations by the remote controller 30.

As another alternative, authentication of the personal ID may be effected by the electronic devices. In such a case, when the authentication is found to have failed (NG), the electronic devices reject remote control signals from the remote controller 30 that has sent the personal ID in question.

On receiving the remote control signal together with the personal ID from the remote controller 30, each of the electronic devices supplements the received signal with identification information (device ID) identifying the electronic device in question, before transferring the ID-equipped signal to the monitor control unit 1. If what is needed by the system is merely to recognize who is staying in which room, the electronic devices may transfer to the monitor control unit 1 only the personal ID along with their device IDs.

The targeted electronic device information memory 108 in the monitor control unit 1 retains device ID-based information specifying which electronic device is installed in which room. In the second embodiment of this invention, as implied above, the electronic devices in addition to the TV set and audio set include lighting fixture on/off controls. These electronic devices are connected to the monitor control unit 1 via a LAN as in the case of the first embodiment.

The monitor control unit 1 detects the personal ID and device ID attached to the remote control signal transferred from each of the electronic devices, and references the targeted electronic device information memory 108. The reference to the memory 108 allows the monitor control unit 1 to recognize that the person identified by the personal ID is staying in the room having the electronic device identified by the device ID.

That is, the monitor control unit 1 checks entries and exits of persons into and from each of the rooms A, B, C and D by detecting the personal IDs and device IDs sent from the electronic devices. Based on the result of the check, the monitor control unit 1 creates a stay-in management information table.

Upon receiving a personal ID and a device ID, the monitor control unit 1 checks to see whether stay-in information about the person identified by that personal ID is found in the current stay-in management information table. If the stay-in information about that person is not found in the table, then the monitor control unit 1 determines that the person in question has for the first time entered the room having the electronic device identified by the device ID in question. In that case, the monitor control unit 1 writes the stay-in information about the person identified by the personal ID to the stay-in management information table.

Also upon receiving a personal ID and a device ID, the monitor control unit 1 may find that the room, which is identified by the device ID and in which the person identified by the personal ID is staying, is different from what is recorded in the stay-in management information table at that point in time. In this case, the person with the personal ID is deemed to have moved from one room to another, and the monitor control unit 1 updates the stay-in management information table in a manner reflecting the current stay-in status of the rooms.

With the second embodiment of the invention, as described above, the monitor control unit 1 receives remote control signals furnished with personal IDs and device IDs from the electronic devices in the rooms A, B, C and D instead of getting personal IDs from the ID transmitter-receiver units 7A, 7B, 7C and 7D. Using the ID-furnished remote control signals, the monitor control unit 1 recognizes entries and exits of each of the family members into and from the rooms A, B, C and D. As with the above-described first embodiment and based on the personal information and priority information about each person entering a given room, the monitor control units 1 controls the status of the electronic devices installed in the room in question.

Suppose now that a family member enters a hitherto-unoccupied room, inserts his or her personal ID card 10 into the remote controller 30 of the room, and performs an operation on the controller 30 to turn on the lighting fixtures. In such a case, a remote control signal which includes the personal ID read from the personal card 10 and which serves to turn on the lighting fixtures is transmitted from the remote controller 30 to the lighting fixture on/ff controls, whereby the lighting is turned on. At this point, the on/off controls send to the monitor control unit 1 a remote control signal including both the personal ID and a device ID of the lighting fixtures.

The monitor control unit 1 recognizes from the clock circuit 107 the time of day at which the remote control signal is acquired, and identifies on the basis of the received device ID the room equipped with the lighting fixture on/off controls having sent the remote control signal. With the personal ID acquired, the monitor control unit 1 reads the corresponding personal information from the family information memory 105. Based on the retrieved personal information, as with the first embodiment discussed above, the monitor control unit 1 generates control signals for controlling the TV set, audio set, etc., in the room identified by the device ID, and supplies the generated control signals to the applicable devices.

With the second embodiment of the invention, the personal ID is sent to the monitor control unit 1 through the electronic devices. This allows the monitor control unit 1 to recognize specific electronic devices that the user wants to operate using the remote controller. In that respect, it is possible to control the user-selected electronic devices on the basis of the user's personal information.

For example, suppose that a family member inserts his or her personal card 10 into the remote controller 30 and operates the controller to turn on the TV set in a given room. In that case, the TV set turns its power on and sends to the monitor control unit 1 a remote control signal furnished with the family member's personal ID and the device ID of this TV set.

The monitor control unit 1 recognizes from the clock circuit 107 the time of day at which the remote control signal is acquired, and determines on the basis of the received device ID the room equipped with the TV set having sent the remote control signal in question. With the personal ID acquired, the monitor control unit 1 reads the corresponding personal information from the family information memory 105. Based on the retrieved personal information, the monitor control unit 1 generates a control signal for the TV set such as a channel selection control signal for selecting the user-selected TV channel, and supplies the generated signal to the TV set.

For example, if a search for the personal information reveals that the person identified by the personal ID prefers TV dramas, and if it is found from EPG that there is a TV channel broadcasting a TV drama at the time of day at which the remote control signal is received, then the monitor control unit 1 generates a control signal for selecting that TV channel and sends the signal to the TV set identified by the device ID. In this case, there is no need to identify the room because the monitor control unit 1 can identify the electronic device using the device ID.

[Restrictions on the Remote Controller Operations According to Personal Information]

<Examples of Restrictions Implemented by the Remote Controller>

As mentioned above, the personal card 10 records not only the personal ID but also personal information such as the card owner's age. In this case, the remote controller 30 reads the personal information from the inserted personal card 10 and imposes restrictions on the controller functions in keeping with the retrieved personal information such as the person's age.

The remote controller 30 contains beforehand, in its nonvolatile memory such as an EEPROM, restriction information for use when retrieved personal information is found to require imposing restrictions on the remote controller functions. The remote controller 30 is thus limited in its functionality in accordance with the restriction information applicable to the personal information of interest.

Figure 25:
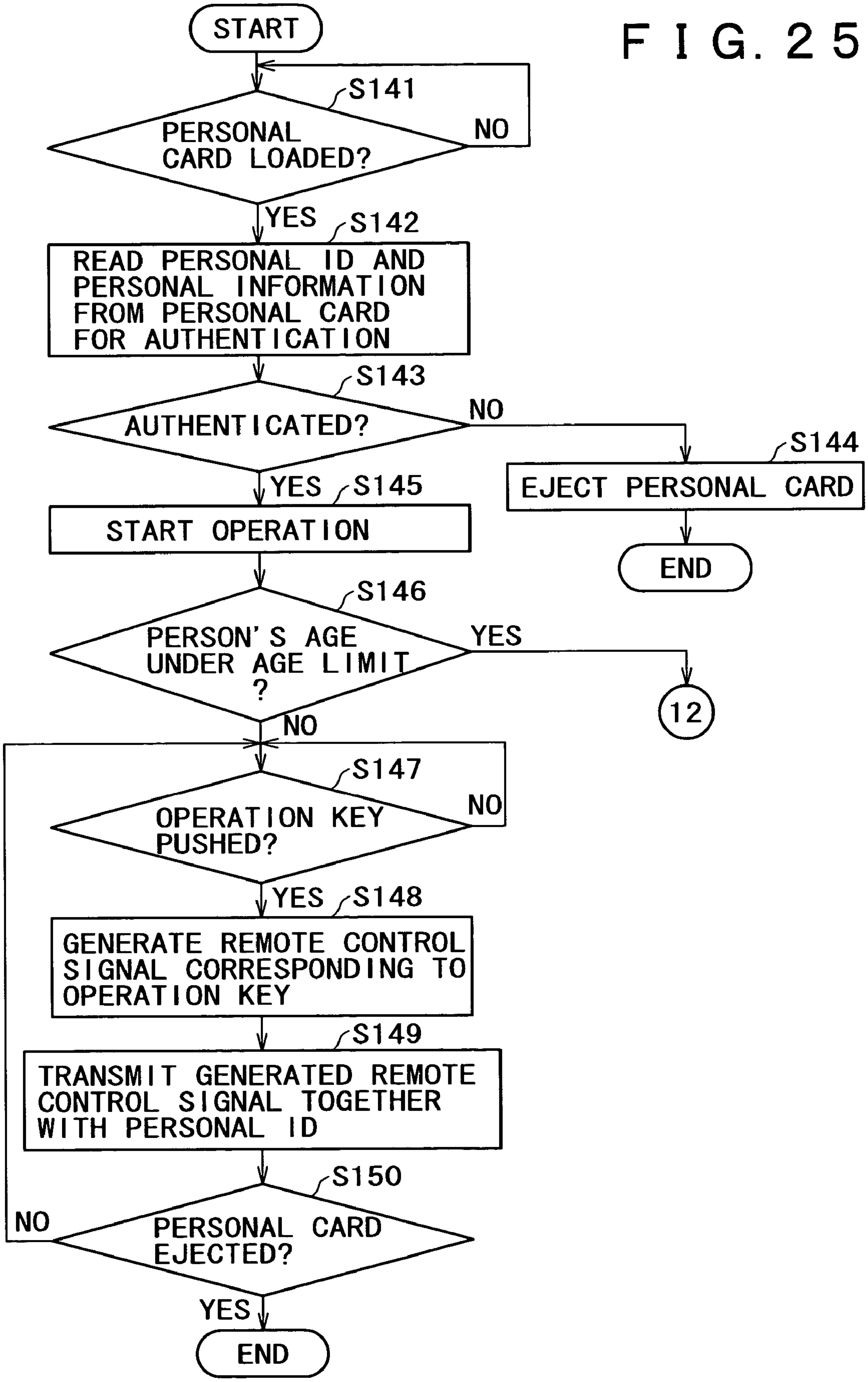
FIG. 25 is another flowchart of steps performed by the remote controller used by the electronic device controlling system constituting the second embodiment.
Figure 26:
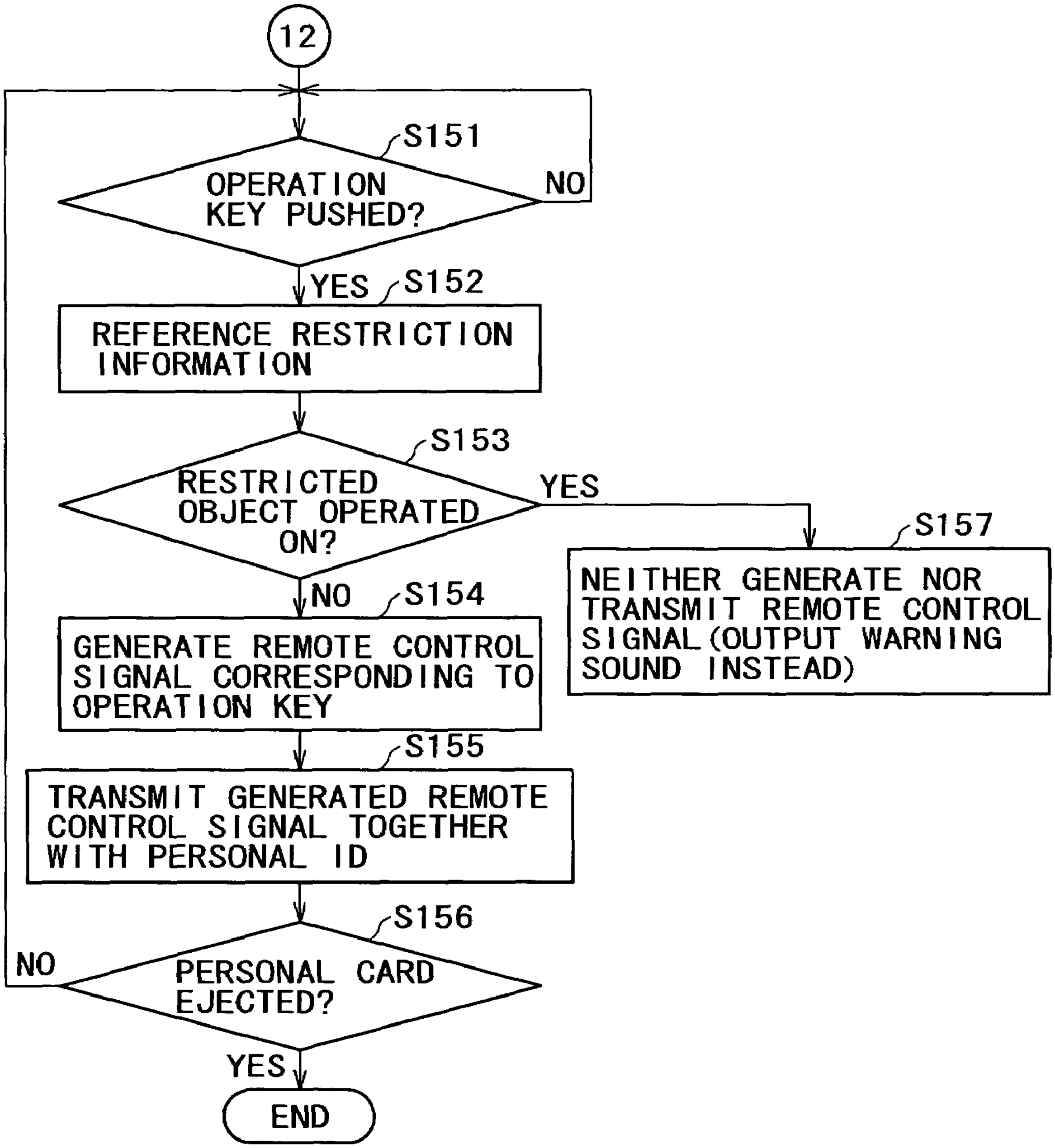
FIG. 26 is another flowchart of steps performed by the remote controller used by the electronic device controlling system constituting the second embodiment.

FIGS. 25 and 26 are flowcharts of steps carried out by the remote controller 30 whose functions are restricted in accordance with the restriction information that applies when the card owner's age is found to be under a predetermined age limit.

The CPU 301 checks to see whether a personal card 10 is loaded (in step S141). If the personal card 10 is found loaded, the CPU 301 reads a personal ID and personal information from the loaded personal card 10 through the read/write unit 311, and places what is retrieved into the RAM 304. The CPU 301 then compares the retrieved personal ID with the personal ID held in the personal ID memory 313 for authentication, i.e., to see whether the personal card 10 loaded in the remote controller 30 is owned by the person whose personal ID has matched the stored ID (in step S142).

If the authentication (in step S143) is found to have failed (NG), the CPU 301 forcibly ejects the personal card 10 (in step S144) and terminates this processing routine. If the authentication is found to be successful (OK), the CPU 301 puts the remote controller 30 into an active state in which key operations by the user are accepted (in step S145).

The CPU 301 references age information within the personal information retrieved from the personal card 10, and determines whether the age is under a predetermined age limit of, say, 12 years (in step S146).

If in step S146 the referenced age is found to be higher than the age limit, the CPU 301 enables the remote controller 30 to become operable without restrictions. More specifically, the CPU 301 waits for any operation key to be pushed (in step S147). When an operation key is found to be pushed, the CPU 301 generates a remote control signal corresponding to the pushed operation key (in step S148). The remote control signal thus generated is sent from the remote control signal transmitter 312 to the electronic devices together with the personal ID held in the RAM 304 (in step S149).

The CPU 301 then determines whether the personal card 10 is ejected by the user's ejecting action from the personal card loading unit 34 of the remote controller 30 (in step S150). If the personal card 10 is found staying loaded, step S147 is reached again and the CPU 301 waits for another operation key to be pushed. If the personal card 10 is found ejected from the remote controller 30, this processing routine is brought to an end.

If in step S146 the referenced age is found to be under the predetermined age limit, the CPU 301 restricts functions of the remote controller 30 based on the restriction information established therein.

More specifically, the CPU 301 waits for any operation key to be pushed (in step S151). When an operation key is found to be pushed, the CPU 301 retrieves and references the established restriction information (in step S152). The CPU 301 then determines whether the remote controller function corresponding to the pushed operation key is subject to the restrictions (in step S153).

If in step S153 the controller function corresponding to the pushed operation key is not found subject to the restrictions, the CPU 301 generates a remote control signal reflecting the pushed operation key. The remote control signal thus generated is sent from the remote control signal transmitter 312 to the electronic devices together with the personal ID held in the RAM 304 (in step S155).

The CPU 301 then determines whether the personal card 10 is ejected by the user's ejecting action from the personal card loading unit 34 of the remote controller 30 (in step S156). If the personal card 10 is found staying loaded, step S151 is reached again and the CPU 301 waits for another operation key to be pushed. If the personal card 10 is found ejected from the remote controller 30, this processing routine is brought to an end.

If in step S153 the remote controller function corresponding to the pushed operation key is found subject to the restrictions, the CPU 301 neither generates nor transmits any remote control signal reflecting the pushed operation key. Instead, the CPU 301 causes a warning sound to be emitted indicating that the operation is restricted (in step S157). Control is then passed on to step S156.

If the remote controller is directed at the TV set, typical restrictions on the remote controller functions include a ban on a child 12 years old or younger watching late-night TV programs (e.g., broadcast after 22:00) or TV programs broadcast on a specific channel. In such cases, it is assumed that the remote controller 30 includes a clock circuit.

If the remote controller 30 is directed at an electronic device capable of connecting to the Internet, the restrictions may include a ban on a child under 18 accessing the URL addresses of the websites whose content is not wholesome for the underage users to watch.

It might happen that the remote controller 30 is directed at a set-top box of a cable TV set in a teleshopping setup. In that case, the prices of goods that may be bought with the remote controller 30 are typically subject to a predetermined price limit.

<Examples of Restrictions Implemented by the Monitor Control Unit 1>

In the above examples, each of the electronic devices was shown transferring the remote control signal received from the remote controller 30 to the monitor control unit 1 together with the personal ID and device ID. In that setup, it is possible for the monitor control unit 1 to check the remote control signal to see whether the corresponding operation is subject to restrictions. If the signal is found to represent a restricted operation, the monitor control unit 1 may output a control signal canceling the received remote control signal and disabling the electronic device identified by the device ID from executing the corresponding operation.

In the case above, the monitor control unit 1 is furnished in advance with restriction information in its nonvolatile memory, the information being arranged to limit certain remote controller-initiated operations of each of the electronic devices installed. Every time a remote control signal is received from an electronic device, the monitor control unit 1 retrieves personal information corresponding to the personal ID attached to the received signal, and references restricted object information such as age from within the retrieved personal information. If the personal information is found subject to the restricted object information, the monitor control unit 1 references the restriction information about the electronic device identified by the device ID, to see whether the remote controller operation in question is restricted. If the remote controller operation is found restricted, the monitor control unit 1 sends a control signal canceling the received remote control signal to the electronic device identified by the device ID.

In the above setup, too, restrictions may be imposed on the time zones in which TV programs may be watched by a particular family member, on the kind of TV programs that may be watched, on the websites that may be browsed on the Internet, and on the prices of goods that may be bought in teleshopping.

[Third Embodiment]

A third embodiment of this invention is characterized in that each of the electronic devices in each of the rooms is furnished with a card loading unit for accommodating the personal card 10. Inserting the personal card 10 into the loading unit of a given electronic device turns that electronic device operable. When the personal card 10 is loaded into an electronic device, that electronic device reads the personal ID from the loaded personal card 10 and sends the retrieved personal ID to the monitor control unit 1 together with the device ID of the electronic device in question.

As with the second embodiment, the monitor control unit 1 of the third embodiment includes a targeted electronic device information memory 108 that holds the device IDs of the control-targeted electronic devices assigned to each of the rooms. On receiving a personal ID and a device ID from a particular electronic device, the monitor control unit 1 of the third embodiment recognizes the person identified by the personal ID, the electronic device identified by the device ID, and the room that is assigned the electronic device in question. It follows that the monitor control unit 1 of the third embodiment can control the electronic devices in a manner similar to the first and the second embodiments.

Whereas the third embodiment has no need for a remote controller that would be activated upon loading of a personal card therein, each electronic device of the third embodiment is arranged to transmit a remote control signal along with a personal ID and a device ID to the monitor control unit 1 as in the case of the second embodiment. This makes it possible, as with the second embodiment, for the monitor control unit 1 of the third embodiment to impose restrictions on the use of the remote controller as discussed earlier.

The third embodiment is structured so that each of the electronic devices may be controlled using its operation keys and without recourse to a remote controller. With this structure in effect, operation information representative of the operation keys being operated may be sent to the monitor control unit 1 in place of a remote control signal. This also makes it possible for the monitor control unit 1 to impose restrictions on the way the electronic devices are used, in the same manner as in the foregoing examples.

[Fourth Embodiment]

With the first through the third embodiments discussed above, the personal information contains taste/preference information input by the users. By referring to the taste/preference information about a specific user having entered a particular room, the monitor control unit 1 of these embodiments was shown controlling the electronic devices in that room according to the tastes and preferences of the user in question. With the fourth embodiment, the remote control signal or operation key information sent to the monitor control unit 1 used by the second or the third embodiment is accumulated as a remote controller operation history in the unit 1 so that the accumulated operation history may serve as a basis for controlling the electronic devices.

That is, the fourth embodiment eliminates the need for the users to enter and establish in advance their taste/preference information. Actual operation patterns in the past of the users are accumulated, and the electronic devices are controlled accordingly. The fourth embodiment thus allows the electronic devices to be controlled in a manner deemed actually desired by each user.

The monitor control unit 1 of the fourth embodiment receives a remote control signal along with a personal ID and a device ID from each of the electronic devices as in the case of the second or the third embodiment. Upon receipt of the signal, the monitor control unit 1 recognizes not only the room occupied by the person identified by the personal ID but also the way the electronic device identified by the device ID is controlled using the remote controller, along with the time of day at which the electronic device is operated (i.e., either the time information contained in the signal from the electronic device, or the time of day at which the signal is received by the monitor control unit 1). These items of information are stored as electronic device usage history information within the personal information constituting the personal profile information. In other words, the fourth embodiment retains in the family information memory 105 or in a separately furnished history memory a history of information per family member about remote controller-initiated operations of each of the electronic devices in each of the rooms along with the times of day at which these operations were performed.

FIG. 27 shows how electronic device usage history information is typically recorded as part of personal profile information in the family information memory 105. The personal profile information in this example includes not only taste/preference information but also the electronic device usage history information. The taste/preference information shown in FIG. 27 is acquired by the monitor control unit 1 based on the electronic device usage history information. The fourth embodiment thus eliminates the need for the users to input their tastes and preferences beforehand.

The electronic device usage history information may be constituted by the history of remote controller operations performed illustratively during the past month. The monitor control unit 1 derives each user's tastes and preferences from that history of remote controller operations. For example, the historical information allows the monitor control unit 1 to determine that a particular user likes watching TV or listening to audio programs.

Given the history of remote controller operations regarding the selection of TV programs, the monitor control unit 1 may reference the genre information in the EPG and determine accordingly that a particular user enjoys, say, dramas or documentary programs. Likewise, a reference to the genre information may allow the monitor control unit 1 to determine what genre of music programs a given user prefers.

Having made such determinations, the monitor control unit 1 writes the acquired taste/preference information about each user into the user's personal information. Because the taste/preference information in this example is derived from the history of remote control operations during the past month, that information is updated every time the monitor control unit 1 carries out its determination process. Alternatively, the taste/preference information may be updated at intervals longer than a month.

As another alternative, the electronic device usage history information may be recorded per room to determine each user's operation pattern regarding each room so that the electronic devices in the respective rooms may be controlled correspondingly. For example, the remote controller operations during a predetermined past period may indicate that the users having entered the room A mostly watch TV programs while the users in the room B primarily listen to music. Given such patterns of remote controller operations, the monitor control unit 1 can control the electronic devices in each of the room accordingly.

It is also possible to record per room a history of remote controller operations at intervals of, say, 30 minutes on each day of the week for a plurality of weeks. The historical information about the remote controller operations thus accumulated makes it possible illustratively to determine the manner in which to control a specific electronic device in a particular room at a given time on a given day of the week.

As described, the fourth embodiment eliminates the need for users to make tedious remote controller operations when enjoying TV programs or music programs as usual in predetermined rooms at predetermined times on each day of the week.

[Other Variations]

In the foregoing description, the electronic devices installed in the rooms A, B, C and D were shown composed mostly of AV equipment such as the TV set and audio set. Alternatively, the electronic devices to be controlled may include personal computers and other devices besides the AV equipment.

Also in the foregoing description, the personal profile information was shown to be stored in the family information memory of the monitor control unit 1 at all times. Alternatively, the personal profile information and electronic device usage history information may be retained in the personal card 10. When the personal card 10 is held onto the ID transmitter-receiver unit or loaded into the remote controller or electronic device, the personal profile information and electronic device usage history information may be transferred to the monitor control unit 1. Based on the personal profile information and electronic device usage history information thus supplied, the monitor control unit 1 may generate a control signal to control the electronic device accordingly as described above.

In the above-described embodiments, the priority information was shown to be set for all rooms with regard to all electronic devices configured. Alternatively, the priority information may be set only for a particular room or rooms and/or regarding a specific electronic device or devices. As another alternative, the priority information may not be stored beforehand in a table but may be assumed from some item of the personal information such as one's relation to other family members. The electronic devices may be controlled on the basis of that assumption.

In the second and the third embodiments discussed above, the remote controller 30 was shown to be furnished in each room. Alternatively, each family member may possess his or her own remote controller and insert his or her personal card into the remote controller upon use.

The above-described embodiments were shown constituting a home network system each. However, this is not limitative of the invention. The invention also applies to a workplace setup made up of a number of rooms or personal spaces. In that setup, a worker entering a given room or space may hold his or her personal card onto an ID transmitter-receiver unit which transmits the personal ID from the card to the monitor control unit. In turn, the monitor control unit may turn on or otherwise control the electronic device in the room or space such as a personal computer that may be operated only by the worker identified by the personal ID.

In this setup, the device IDs of the electronic devices such as PCs may be registered beforehand as part of the personal information about the workers who are to handle these devices, in conjunction with the personal IDs of these workers. The registered information allows the monitor control unit 1 to determine the electronic device corresponding to each personal ID and control the device accordingly.

In the case of the above-described embodiments involving accumulation of the historical information about operations, the monitor control unit 1 need not have device IDs registered beforehand as part of the personal information. Instead, the information about each user's operations in a predetermined past period may be referenced by the monitor control unit 1 to determine the electronic device to be controlled in accordance with the personal ID of the user in question.

In the foregoing embodiments, communication between the personal card 10 and the read/write unit was shown executed by electromagnetic induction. Alternatively, short-range wireless communication techniques such as Bluetooth may be adopted to implement wireless communication between the personal card and the read/write unit. In such a case, the personal card 10 need not be held onto the read/write unit. As long as the person carrying the personal card 10 is in a given room, communication may be conducted between the personal card 10 and the read/write unit of the room in suitably timed fashion. Whenever the person having the personal card 10 enters or leaves a particular room, his or her entry or exit into or out of that room may be detected.

In the case above, measures should be taken to ensure that communication will not occur inadvertently between the personal card 10 and the read/write unit of an adjacent room. Such measures typically involve utilizing radio emissions of very low intensity and shielding each room to prevent radio wave leakage therefrom. With the adequate measures in place, the users carrying the personal card 10 may have their entries and exits into and out of each room registered in automated and reliable fashion.

In the first embodiment, the ID transmitter-receiver unit connected to the monitor control unit 1 was shown detecting users' movements and the destinations of these movements. In the second and the third embodiments, the remote controller 30 was shown transmitting a personal ID to the monitor control unit 1 for use in detecting the entry and exit of each user into and out of each room. Alternatively, both the ID transmitter-receiver unit and the remote controller 30 may be used in combination to detect the entry and exit of each user into and out of each room. As another alternative, the above-mentioned short-range wireless communication techniques may be adopted to implement wireless communication whereby the persons' movements and the destinations of these movements may be detected.

In the above-described embodiments, the personal card incorporating the control IC and the read/write unit for use in combination therewith were shown constituting the personal identification information transmitting elements. Alternatively, each of the rooms may be equipped with buttons each assigned to each of the persons using the room. In this setup, personal identification information transmitting elements may be provided in such a manner that pushing a particular button may generate the corresponding personal ID and transfer the generated ID to the monitor control unit 1.

As many apparently different embodiments of this invention may be made without departing from the spirit and scope thereof, it is to be understood that the invention is not limited to the specific embodiments thereof except as defined in the appended claims.

What is claimed is:

1. An electronic device controlling apparatus comprising:

a communication device that communicates with electronic devices;

a storage that stores personal identification information and personal information in correspondence with each other;

a receiver that receives the personal identification information and device identification information corresponding to an electronic device from the electronic device, wherein the electronic device acquires the personal identification information from a remote controller corresponding to the electronic device, and the remote controller acquires the personal identification information from a portable storage device loaded into the remote controller;

a search device that searches the storage for the personal information corresponding to the personal identification information received by the receiver; and a controller that, based on the personal information searched for by the search device, causes the communication device to transmit a control signal to the electronic device corresponding to the device identification information.

2. The electronic device controlling apparatus according to claim 1, wherein the storage stores the personal identification information, the personal information, and priority information about a plurality of persons.

3. The electronic device controlling apparatus according to claim 1, wherein the receiver receives the personal identification information for a plurality of persons and the controller determines priorities of the plurality of persons on the basis of the personal information and priority information corresponding to the personal identification information received by the receiver about the plurality of persons, the controller transmitting the control signal reflecting the priorities of the plurality of persons to the electronic devices.

4. An electronic device controlling system comprising:

one or more electronic devices;

an electronic device controlling apparatus;

one or more remote controllers for receiving personal identification information from one or more portable storage devices loaded into the one or more remote controllers and for transmitting the personal identification information to the one or more electronic devices;

the one or more electronic devices transmitting the personal identification information and device identification information to the electronic device controlling apparatus; and the electronic device controlling apparatus being connected to the one or more electronic devices and being capable of controlling the one or more electronic devices;

wherein the electronic device controlling apparatus includes:

a communication device for communicating with the one or more electronic devices;

a receiver for receiving the personal identification information and the device identification information from an electronic device corresponding to the device identification information;

a storage for storing the personal identification information and personal information in correspondence with each other;

a search device for searching the storage for the personal information corresponding to the personal identification information received by the receiver; and a controller for, based on the personal information searched for by the search device, causing the communication device to transmit a control signal to the electronic device corresponding to the device identification information received by the receiver.

5. The electronic device controlling system according to claim 4, wherein the storage stores the personal identification information, the personal information, and priority information about a plurality of persons.

6. The electronic device controlling system according to claim 4, wherein the receiver receives the personal identification information for a plurality of persons and the controller determines priorities of the plurality of persons on the basis of the personal information and priority information corresponding to the personal identification information received by the receiver about the plurality of persons, the controller transmitting the control signal reflecting the priorities of the plurality of persons to the electronic device.

7. An electronic device controlling method comprising:

causing a remote controller to acquire personal identification information from a portable storage device loaded into the remote controller and to transmit the personal identification information to an electronic device corresponding to the remote controller;

receiving the personal identification information and device identification information corresponding to the electronic device from the electronic device;

searching for personal information corresponding to the personal identification information in a storage which stores the personal identification information and the personal information in correspondence with each other; and transmitting a control signal to the electronic device corresponding to the device identification information, the control signal being based on the personal information.

8. The electronic device controlling method according to claim 7, wherein the storage stores the personal identification information, the personal information, and priority information about a plurality of persons.

9. The electronic device controlling method according to claim 7, further comprising the steps of determining priorities of a plurality of persons on the basis of the personal information and priority information about the plurality of persons, and transmitting the control signal reflecting the priorities of the plurality of persons to the electronic device.

10. An electronic device controlling apparatus comprising:

a communication device that communicates with electronic devices;

a storage that stores personal identification information and personal information in correspondence with each other;

a receiver that receives the personal identification information and device identification information corresponding to an electronic device, wherein the electronic device acquires the personal identification information from a remote controller corresponding to the electronic device, and the remote controller acquires the personal identification information from a portable storage device without contacting the portable storage device;

a search device that searches the storage for the personal information corresponding to the personal identification information received by the receiver; and a controller that, based on the personal information searched for by the search device, causes the communication device to transmit a control signal to the electronic device corresponding to the device identification information.

11. An electronic device controlling system comprising:

a portable storage device;

one or more electronic devices;

an electronic device controlling apparatus;

one or more remote controllers for receiving personal identification information from the portable storage device without contacting the portable storage device and for transmitting the personal identification information to the one or more electronic device;

the one or more electronic devices transmitting the personal identification information and device identification information to the electronic device controlling apparatus; and the electronic device controlling apparatus being connected to the one or more electronic devices and being capable of controlling the one or more electronic devices;

wherein the electronic device controlling apparatus includes:

a communication device for communicating with the one or more electronic devices;

a receiver for receiving the personal identification information and the device identification information from an electronic device corresponding to the device identification information;

a storage for storing the personal identification information and personal information in correspondence with each other;

a search device for searching the storage for the personal information corresponding to the personal identification information received by the receiver; and a controller for, based on the personal information searched for by the search device, causing the communication device to transmit a control signal to the electronic device corresponding to the device identification information received by the receiver.

12. An electronic device controlling method comprising:

causing a remote controller to acquire personal identification information from a portable storage device without contacting the portable storage device and to transmit the personal identification information to an electronic device corresponding to the remote controller;

receiving the personal identification information and device identification information corresponding to the electronic device from the electronic device;

searching for personal information corresponding to the personal identification information in a storage which stores the personal identification information and the personal information in correspondence with each other; and transmitting a control signal to the electronic device corresponding to the device identification information, the control signal being based on the personal information.

* * * * *